(12) United States Patent
Iwase et al.

(10) Patent No.: US 12,478,930 B2
(45) Date of Patent: Nov. 25, 2025

(54) ELECTROLYTE ANALYSIS APPARATUS

(71) Applicant: HITACHI HIGH-TECH CORPORATION, Tokyo (JP)

(72) Inventors: Yuichi Iwase, Tokyo (JP); Takushi Miyakawa, Tokyo (JP); Takahiro Kumagai, Tokyo (JP); Haruyoshi Yamamoto, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 549 days.

(21) Appl. No.: 17/790,784

(22) PCT Filed: Dec. 3, 2020

(86) PCT No.: PCT/JP2020/045113
§ 371 (c)(1),
(2) Date: Jul. 5, 2022

(87) PCT Pub. No.: WO2021/140796
PCT Pub. Date: Jul. 15, 2021

(65) Prior Publication Data
US 2023/0044702 A1 Feb. 9, 2023

(30) Foreign Application Priority Data
Jan. 6, 2020 (JP) ................. 2020-000494

(51) Int. Cl.
*G01N 27/416* (2006.01)
*B01F 23/40* (2022.01)
(Continued)

(52) U.S. Cl.
CPC ............ *B01F 23/483* (2022.01); *B01F 23/45* (2022.01); *B01F 25/4331* (2022.01);
(Continued)

(58) Field of Classification Search
CPC .......... G01N 2035/00534; G01N 2035/00544; G01N 2035/1032; G01N 2035/1058;
(Continued)

(56) References Cited

U.S. PATENT DOCUMENTS 5,800,056 A 9/1998 Suzuki et al.
6,171,552 B1 1/2001 Takeya et al.
(Continued)

FOREIGN PATENT DOCUMENTS

JP 6-31148 A 2/1994
JP 9-33538 A 2/1997
(Continued)

OTHER PUBLICATIONS

International Preliminary Report on Patentability, mailed Jul. 12, 2022, including Written Opinion of the International Searching Authority, mailed Jan. 12, 2021, for International Application No. PCT/JP2020/045113.
(Continued)

*Primary Examiner* — Gurpreet Kaur
(74) *Attorney, Agent, or Firm* — Baker Botts L.L.P.

(57) ABSTRACT

Provided is an electrolyte analysis apparatus capable of diluting and preparing a reagent with higher accuracy with a simpler device configuration, comprising a first flow path configured to send a high-concentration reagent from a high-concentration reagent bottle, a second flow path configured to send a reagent diluent from a reagent diluent bottle that stores the reagent diluent for diluting the high-concentration reagent, a junction unit configured to join the first flow path and the second flow path, a third flow path configured to send a mixed liquid, a dilution tank configured to store the prepared reagent, a prepared reagent discharge nozzle configured to discharge the prepared reagent, a liquid sending mechanism configured to send the reagent and the
(Continued)

reagent diluent to the junction unit at a predetermined ratio so that the prepared reagent has a predetermined concentration, and an analysis unit configured to perform analysis with the prepared reagent.

14 Claims, 19 Drawing Sheets

(51) Int. Cl.
*B01F 23/45* (2022.01)
*B01F 25/433* (2022.01)
*G01N 35/10* (2006.01)
*B01F 101/23* (2022.01)

(52) U.S. Cl.
CPC ....... *G01N 27/416* (2013.01); *G01N 35/1002* (2013.01); *B01F 2101/23* (2022.01)

(58) Field of Classification Search
CPC ............. G01N 27/416; G01N 35/1002; G01N 35/1016; G01N 35/1095; B01F 2101/23; B01F 23/45; B01F 23/483
See application file for complete search history.

(56) References Cited

U.S. PATENT DOCUMENTS

| | | | |
|---|---|---|---|
| 2007/0119711 A1* | 5/2007 | Ausserer | C07K 1/26 204/601 |
| 2011/0184570 A1* | 7/2011 | Nakanishi | G01N 35/1002 700/285 |
| 2018/0149625 A1 | 5/2018 | Hewitson et al. | |
| 2019/0154718 A1 | 5/2019 | Veiner | |
| 2019/0265187 A1* | 8/2019 | Kishioka | G01N 1/00 |
| 2021/0165009 A1 | 6/2021 | Miyakawa et al. | |

FOREIGN PATENT DOCUMENTS

| | | |
|---|---|---|
| JP | 10-274657 A | 10/1998 |
| JP | 2000-214174 A | 8/2000 |
| JP | 2017-15418 A | 1/2017 |
| WO | WO 2019/198400 A1 | 10/2019 |

OTHER PUBLICATIONS

International Search Report, mailed Jan. 12, 2021, for International Application No. PCT/JP2020/045113.
Extended European Search Report, mailed Jan. 23, 2024, for European Application No. 20913027.7.

* cited by examiner

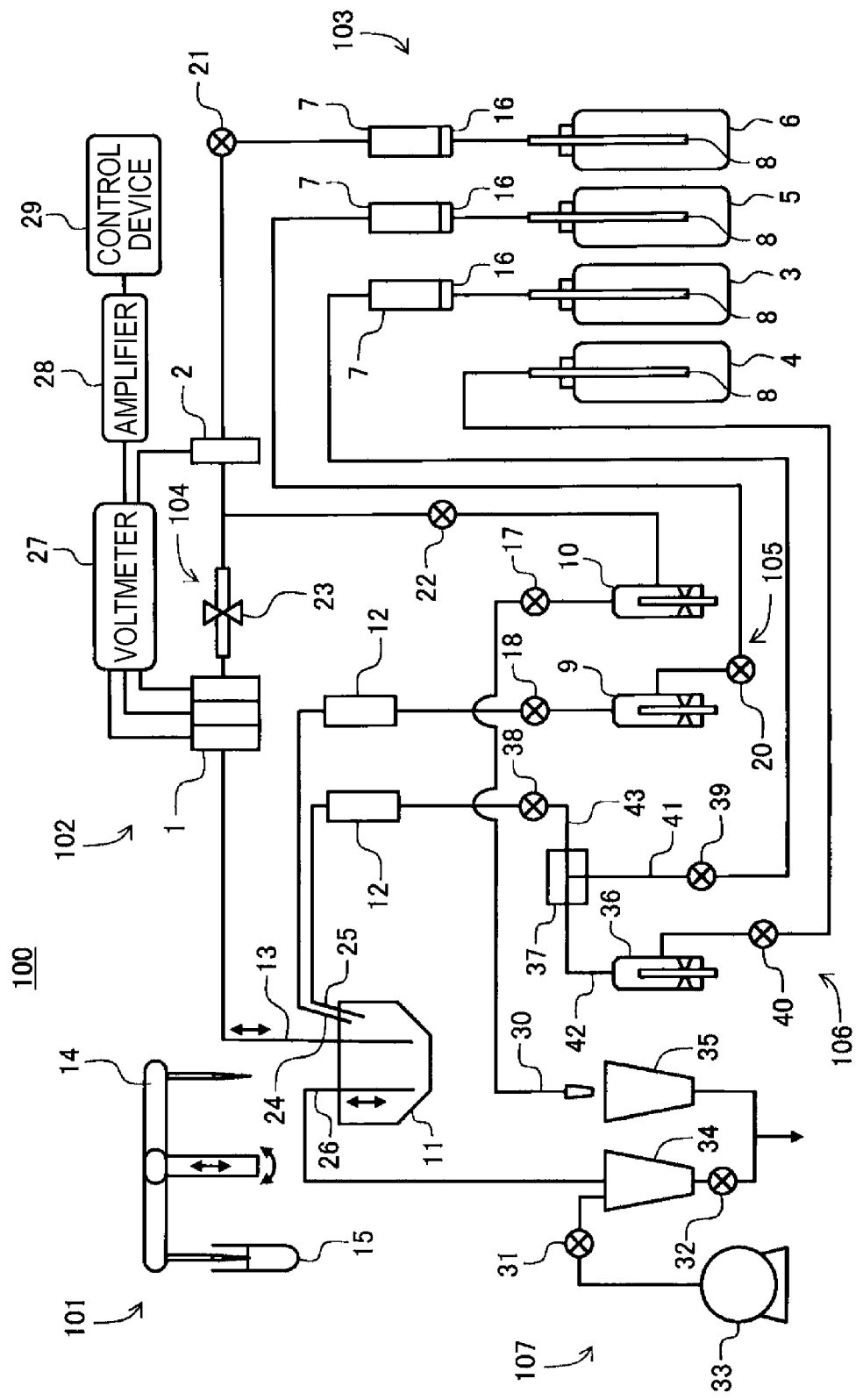
[FIG. 1]

[FIG. 2]
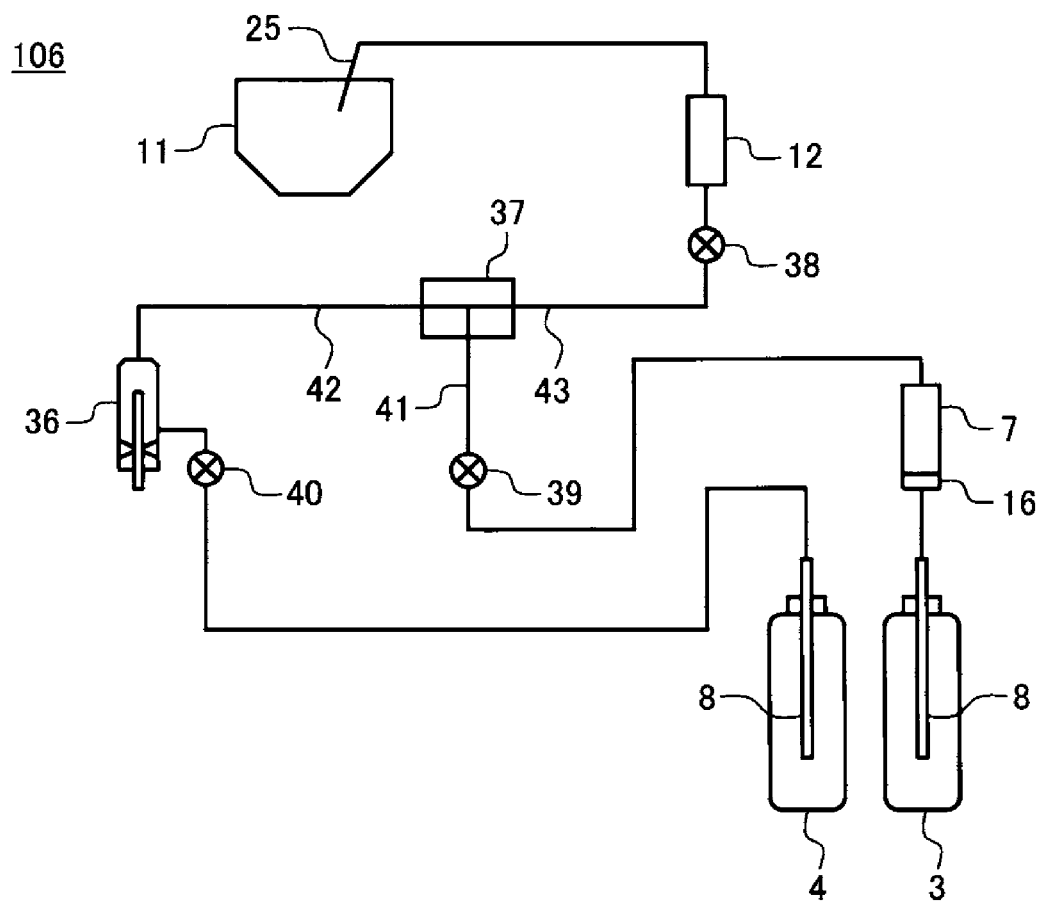

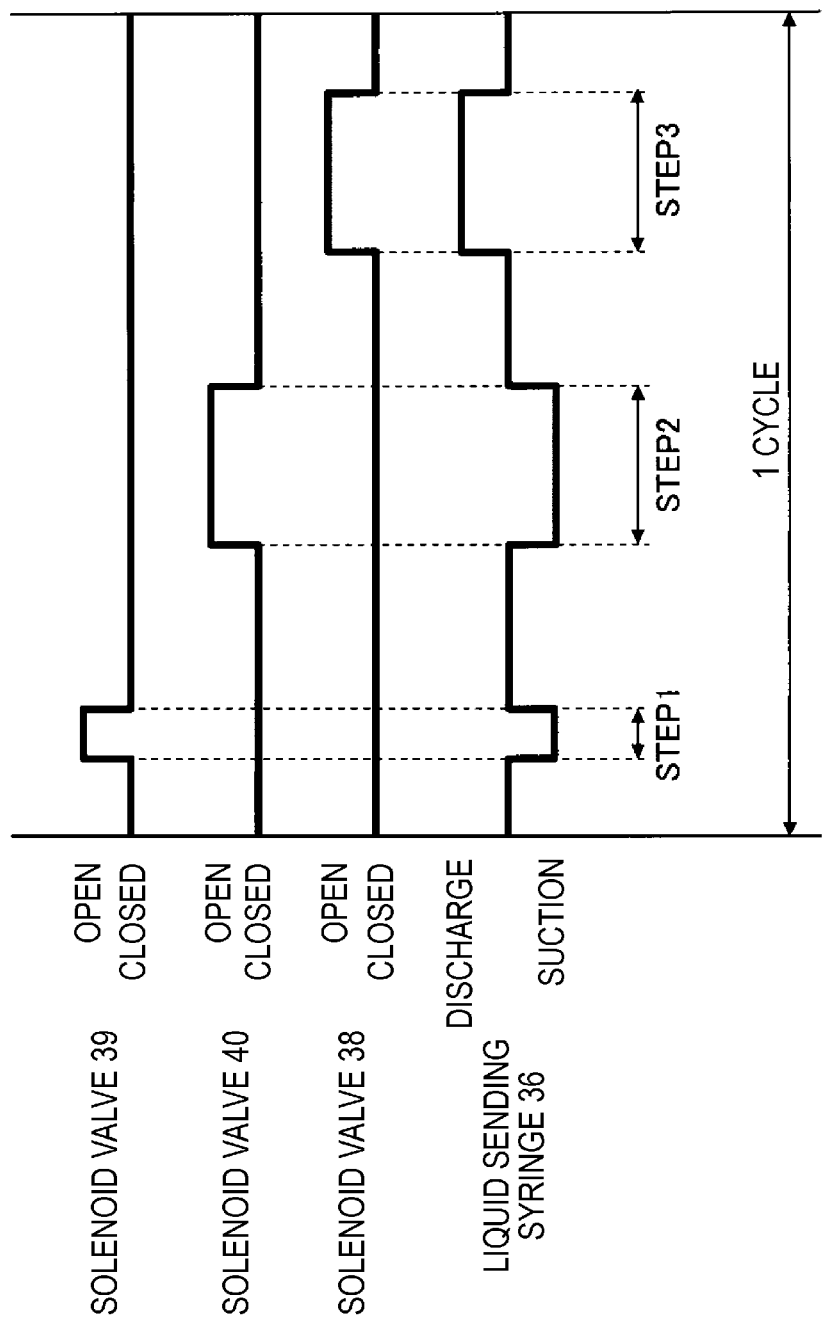
[FIG. 3]

[FIG. 4]
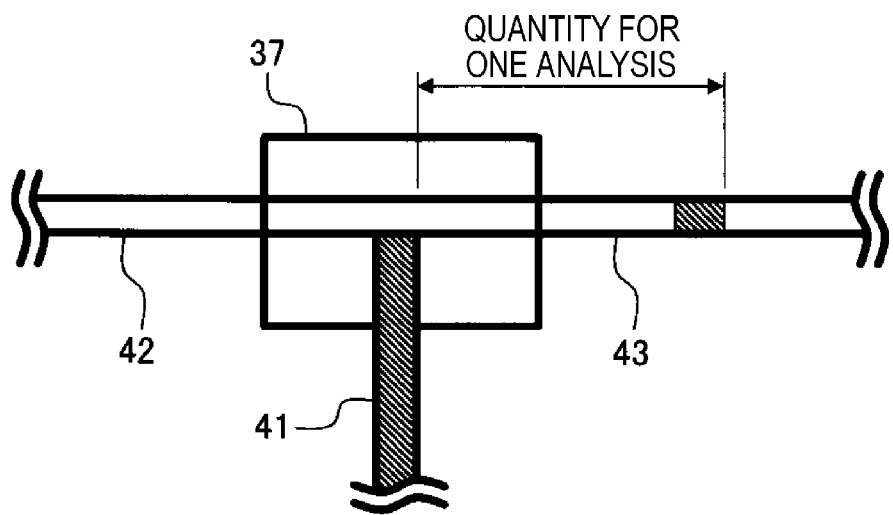

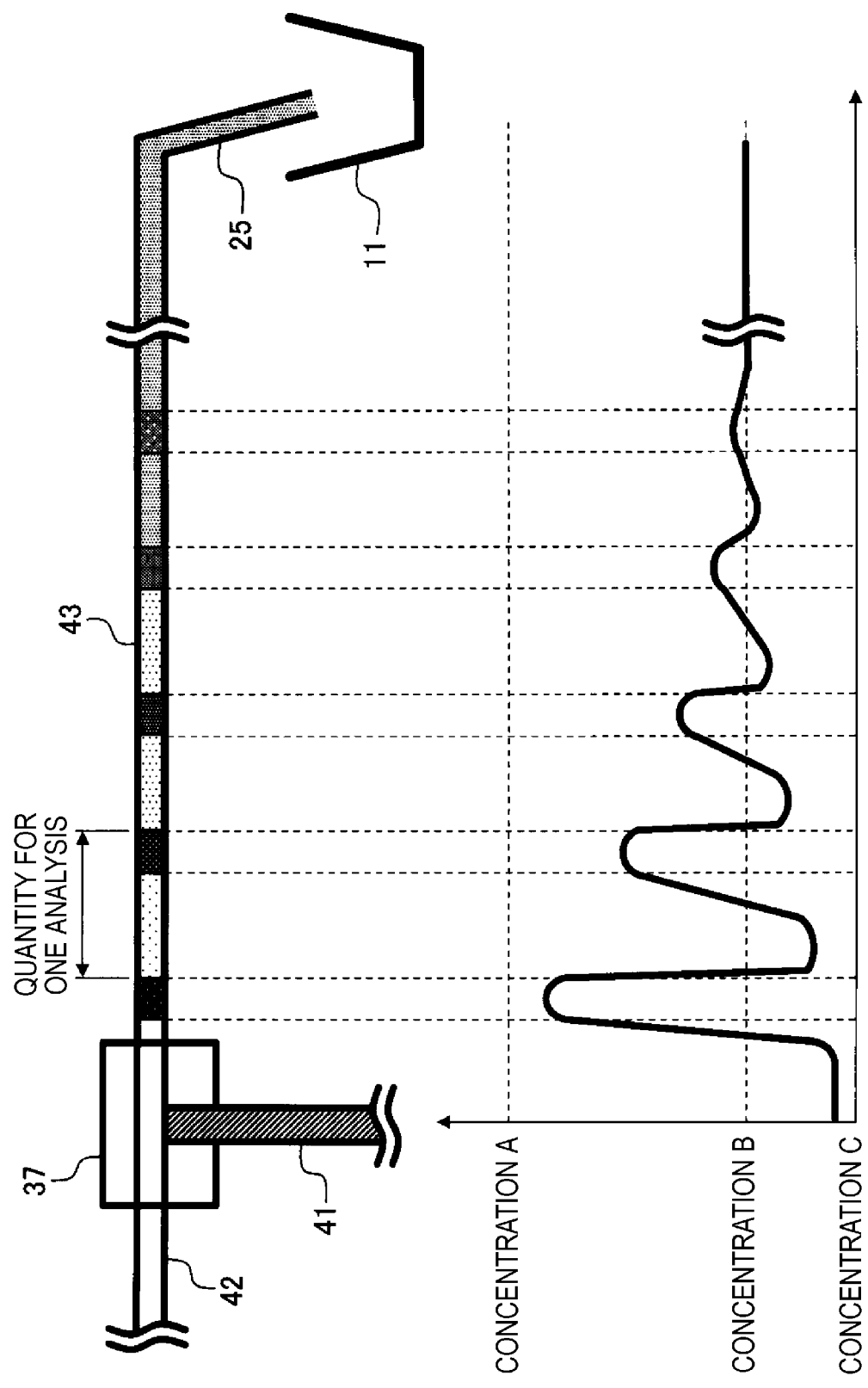
[FIG. 5]

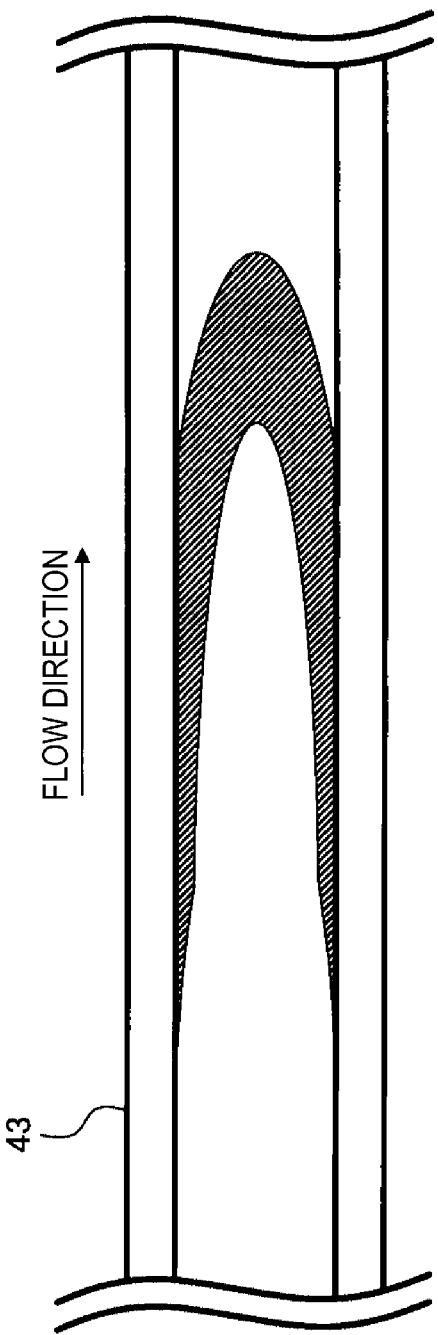
[FIG. 6]

[FIG. 7]
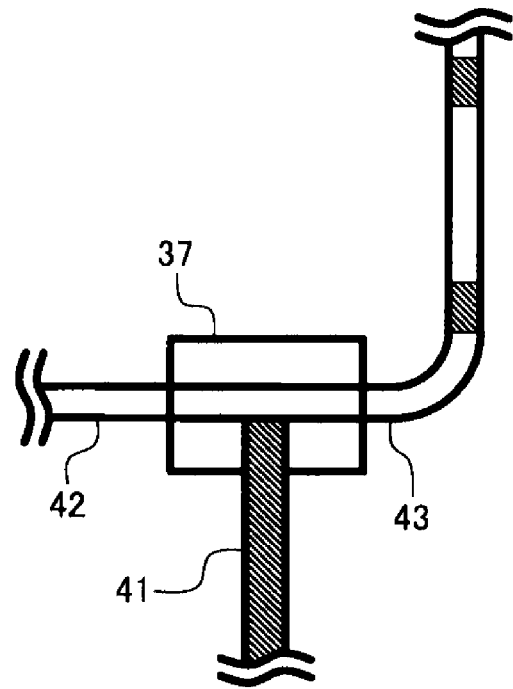
[FIG. 8]
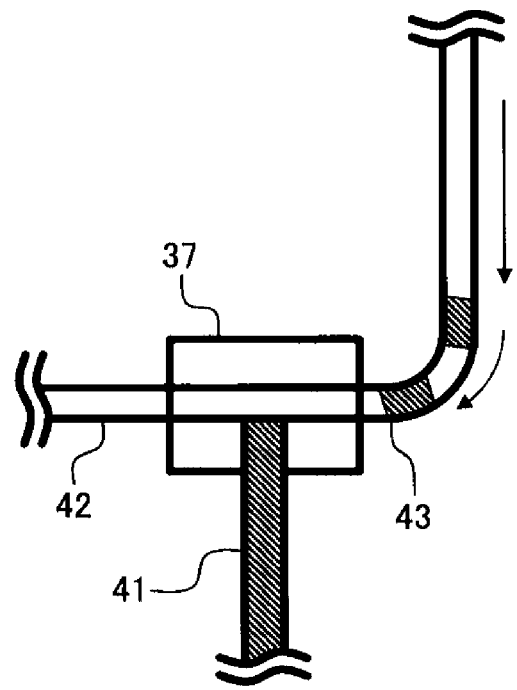

[FIG. 9]
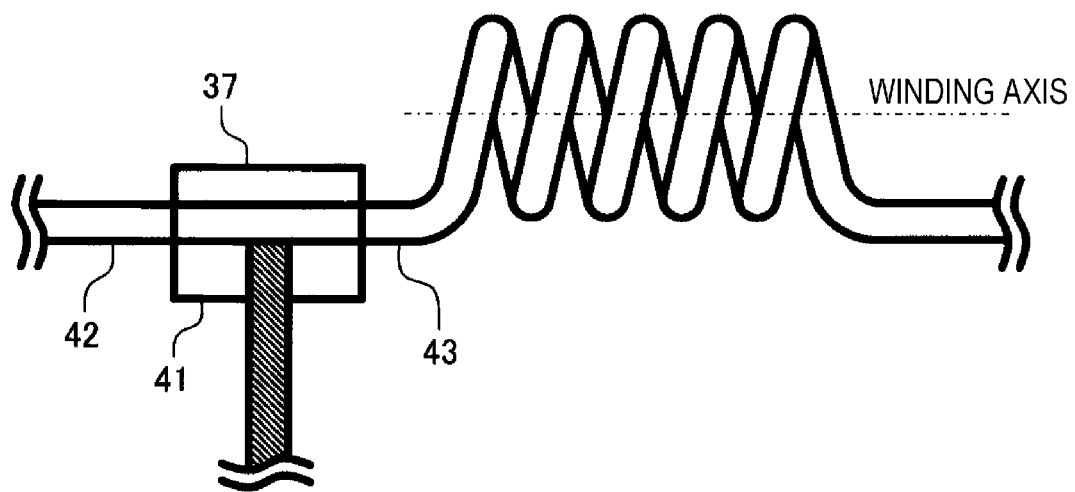

[FIG. 10]
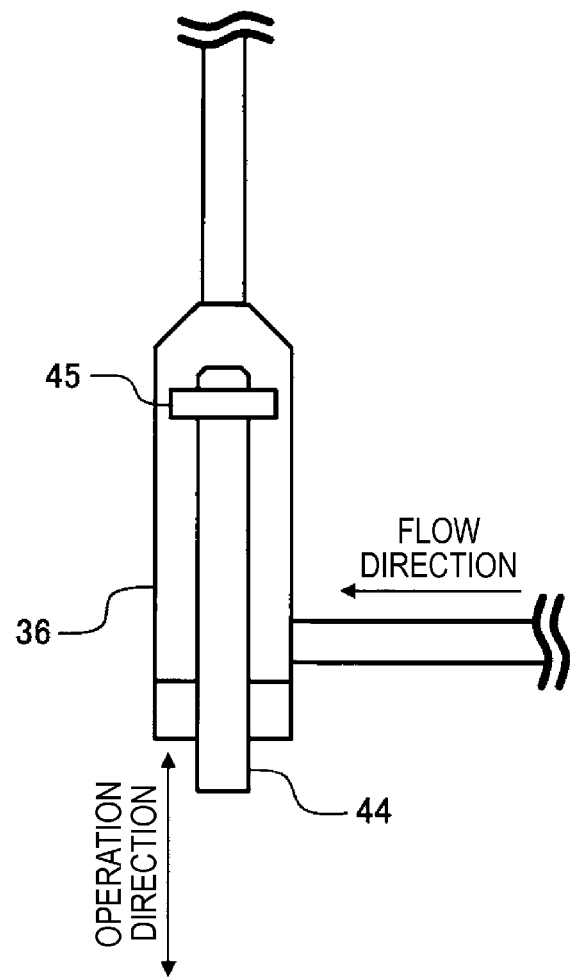

[FIG. 11]
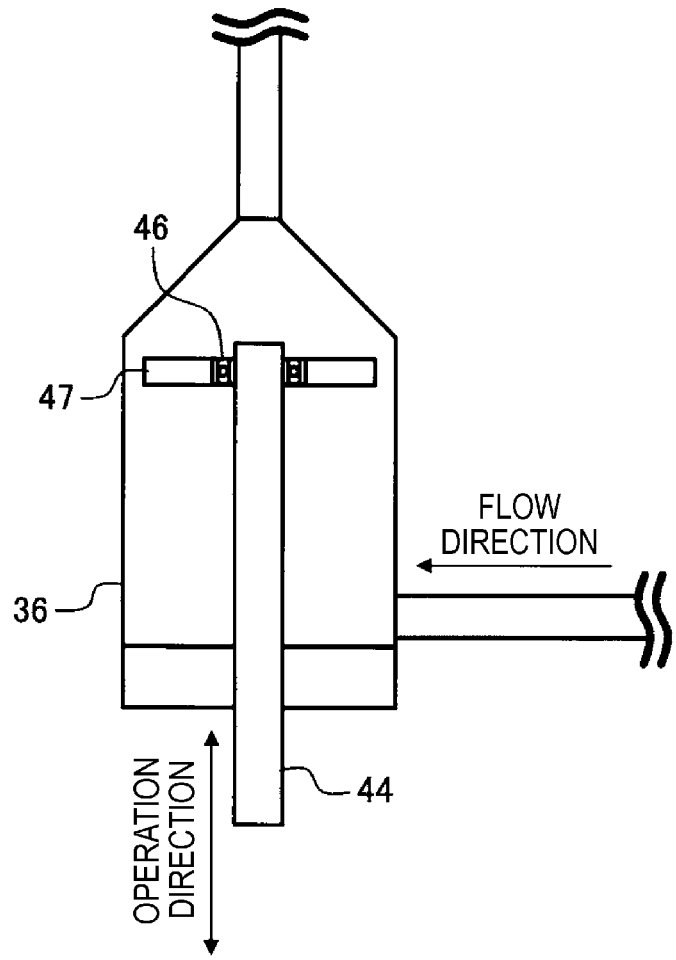
[FIG. 12]
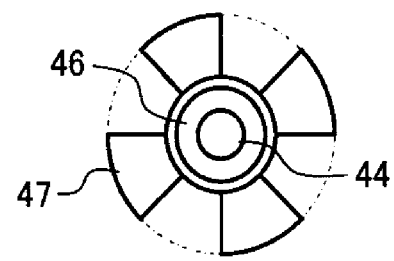

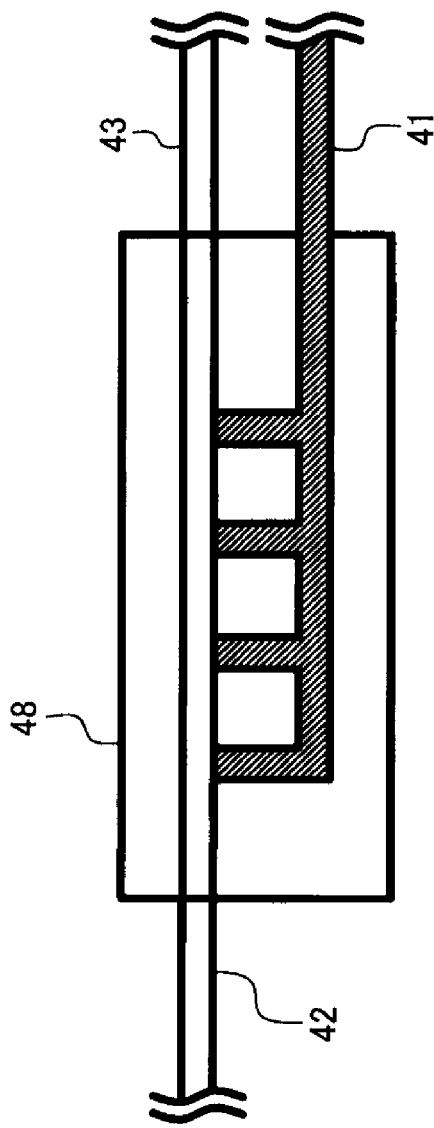
[FIG. 13]

[FIG. 14]
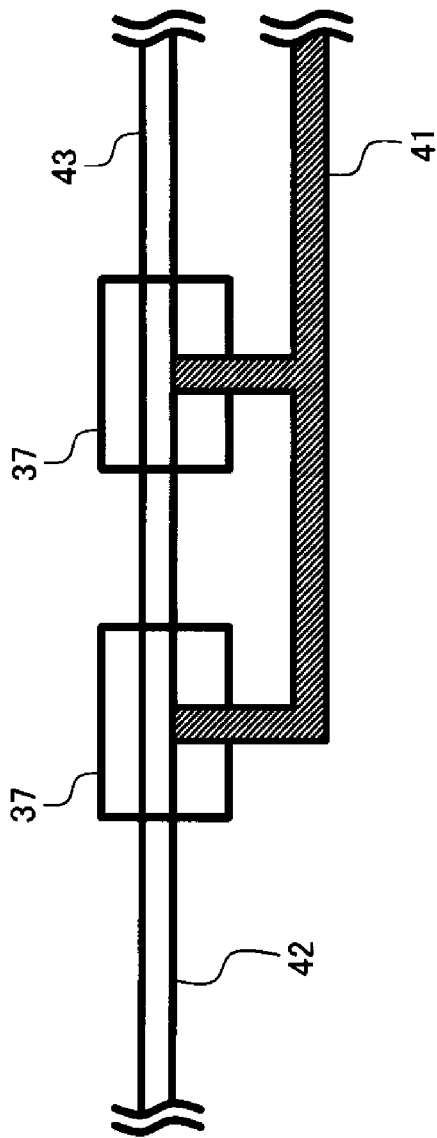

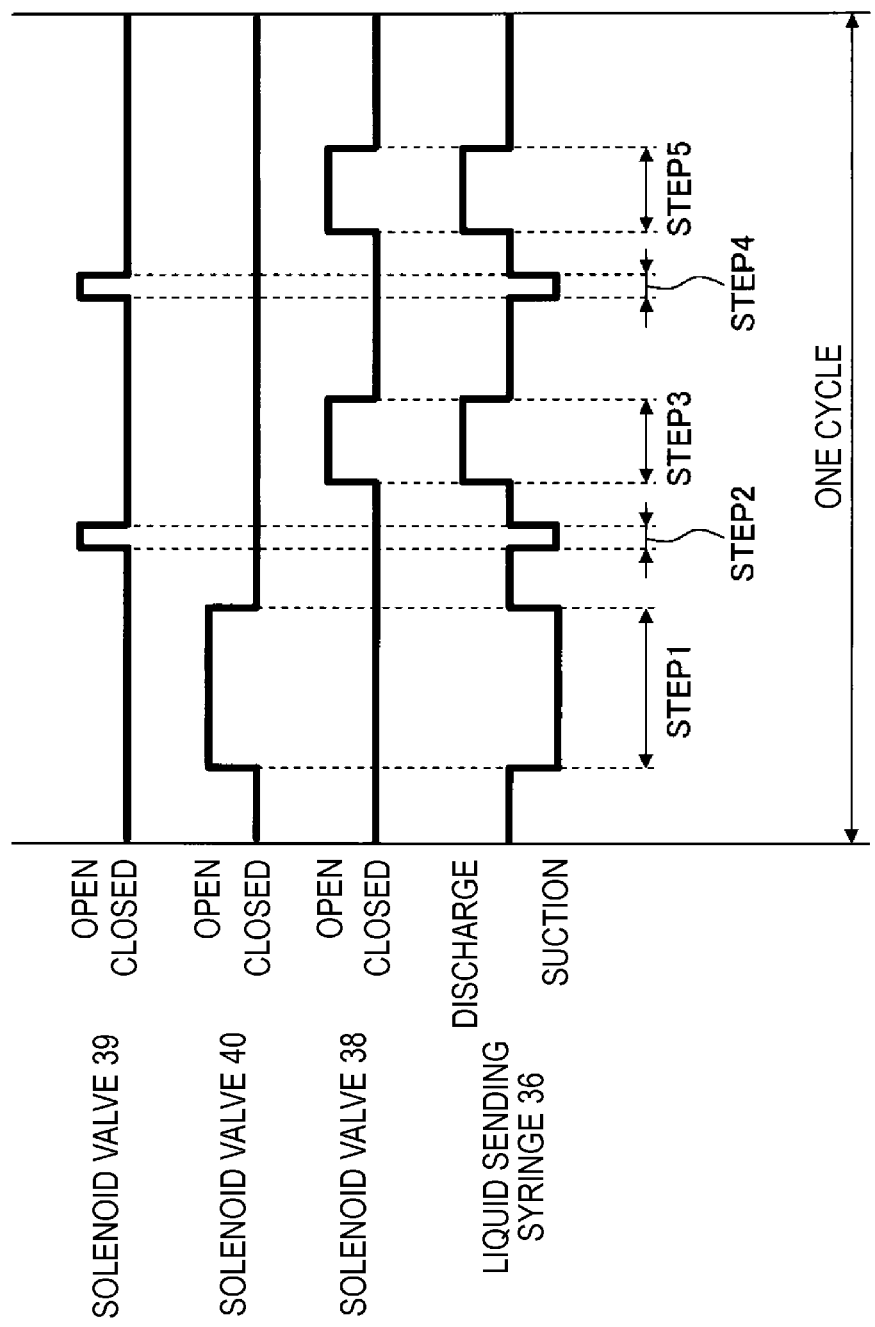
[FIG. 15]

[FIG. 16]
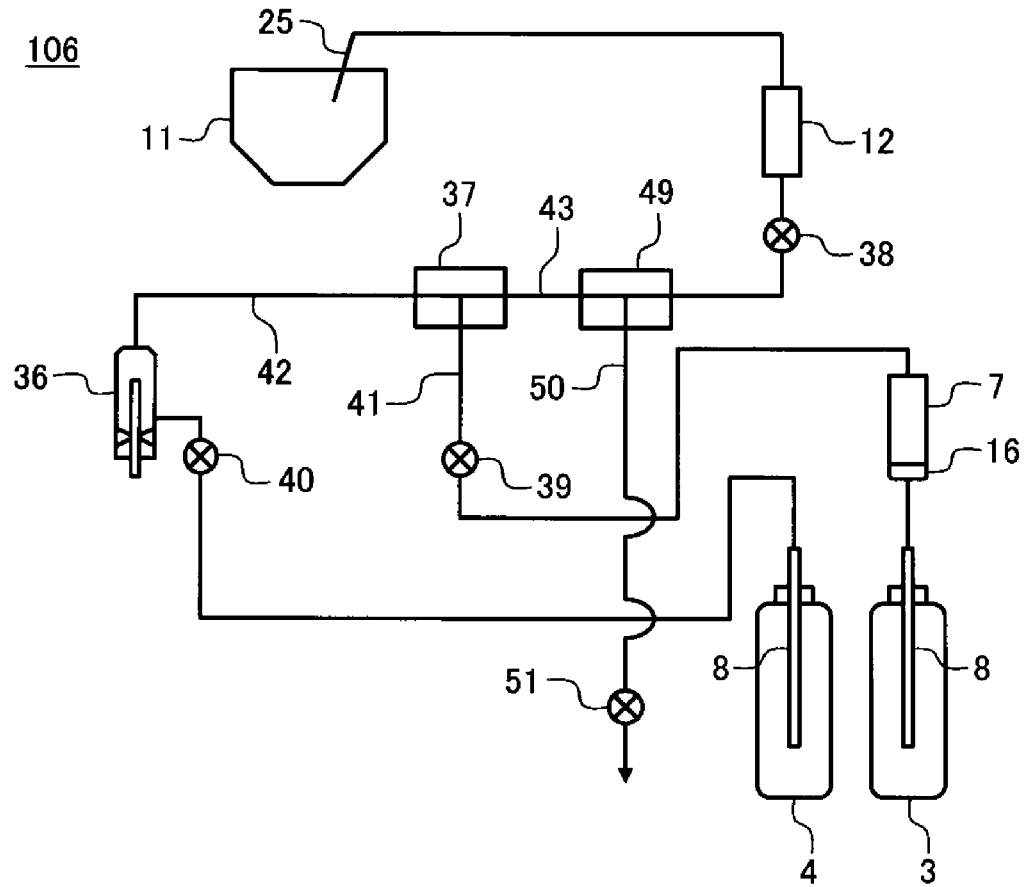
[FIG. 17]
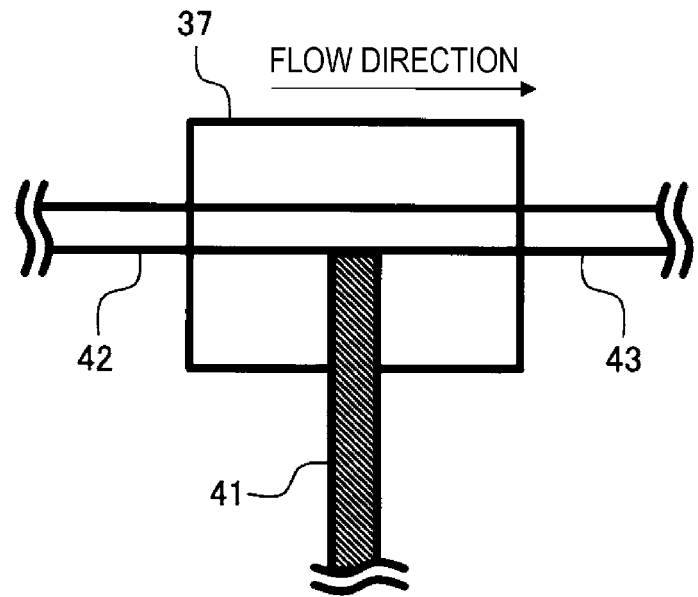

[FIG. 18]
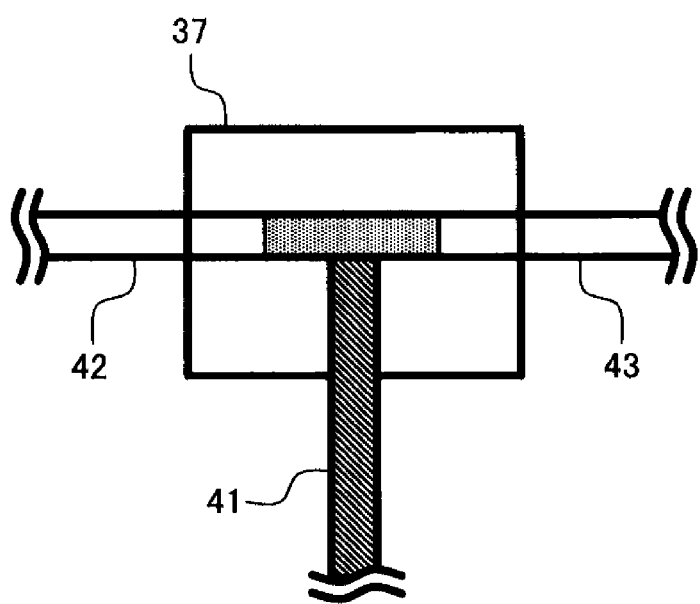

[FIG. 19]
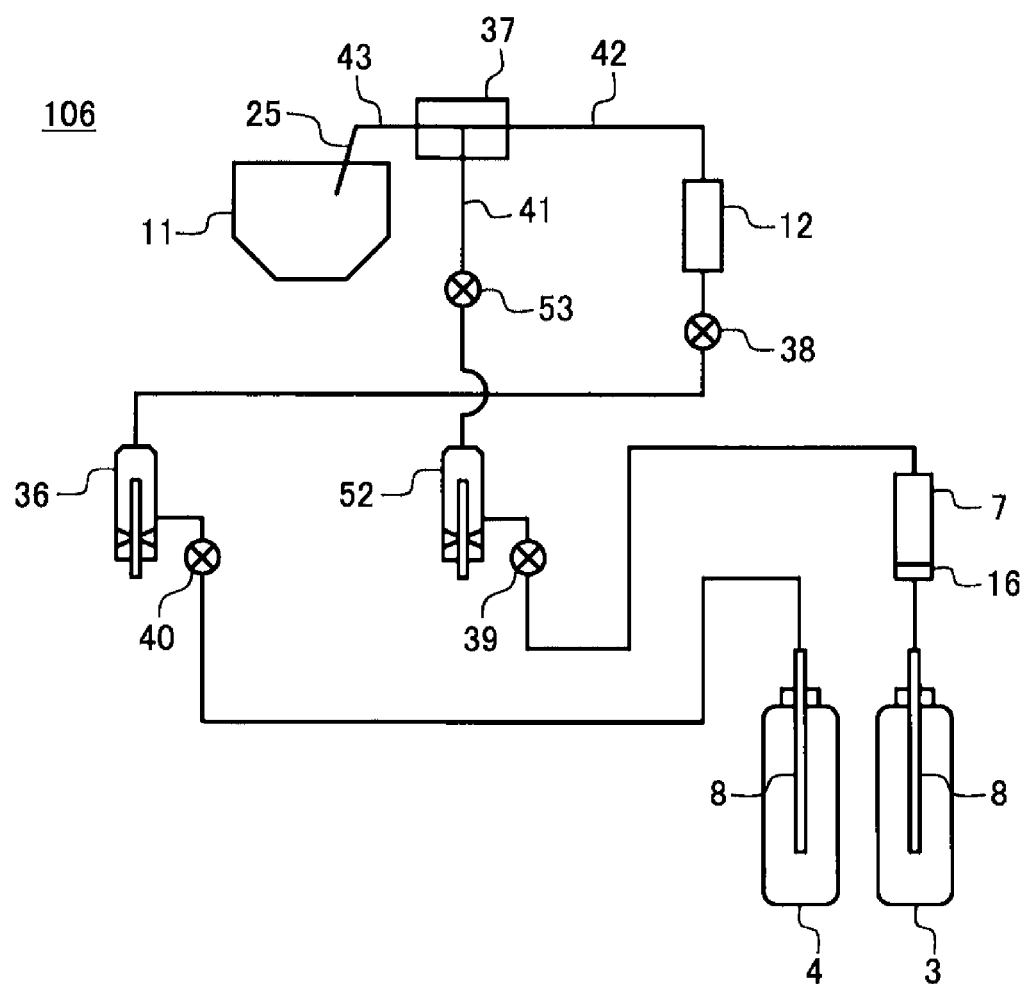

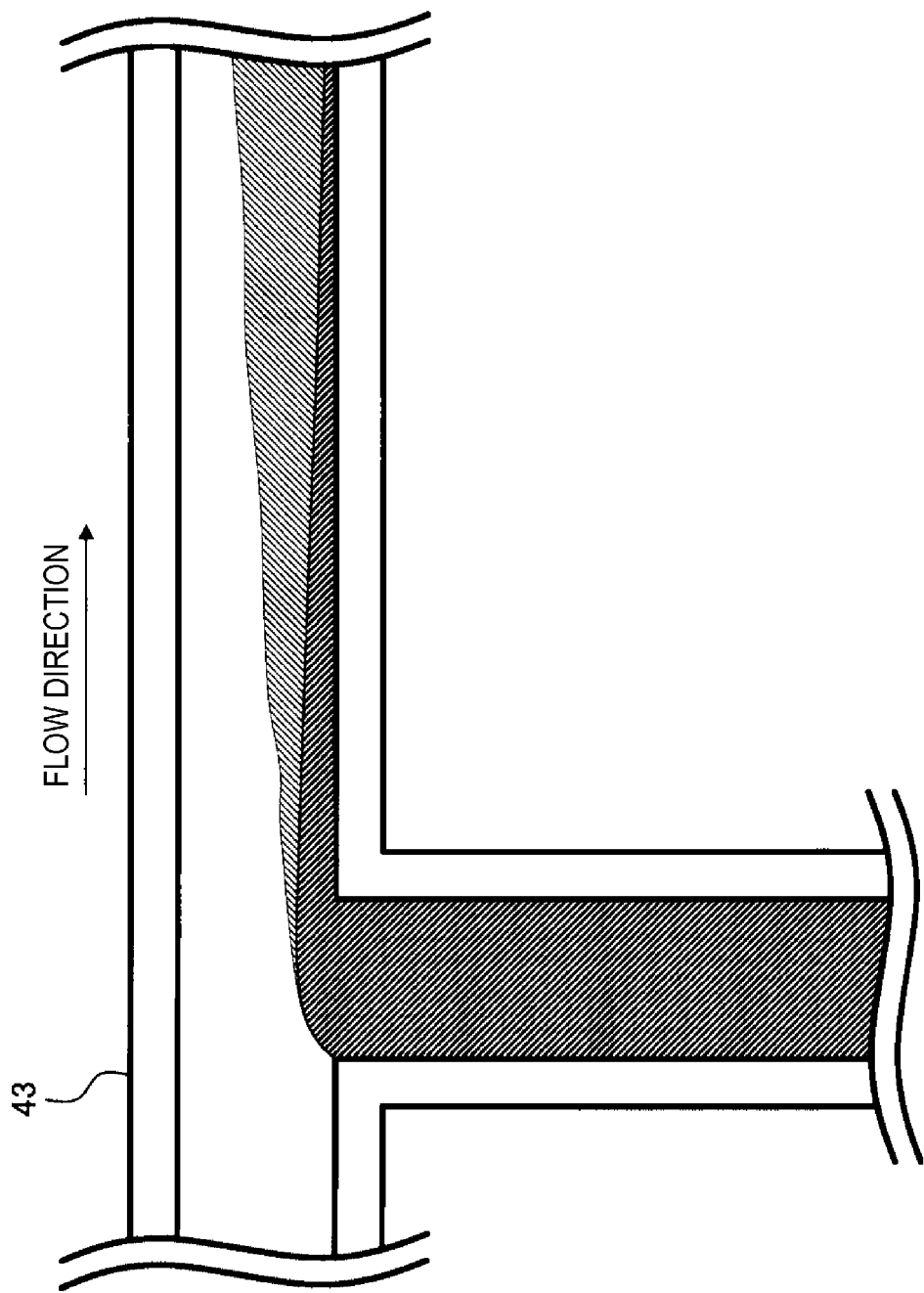
[FIG. 20]

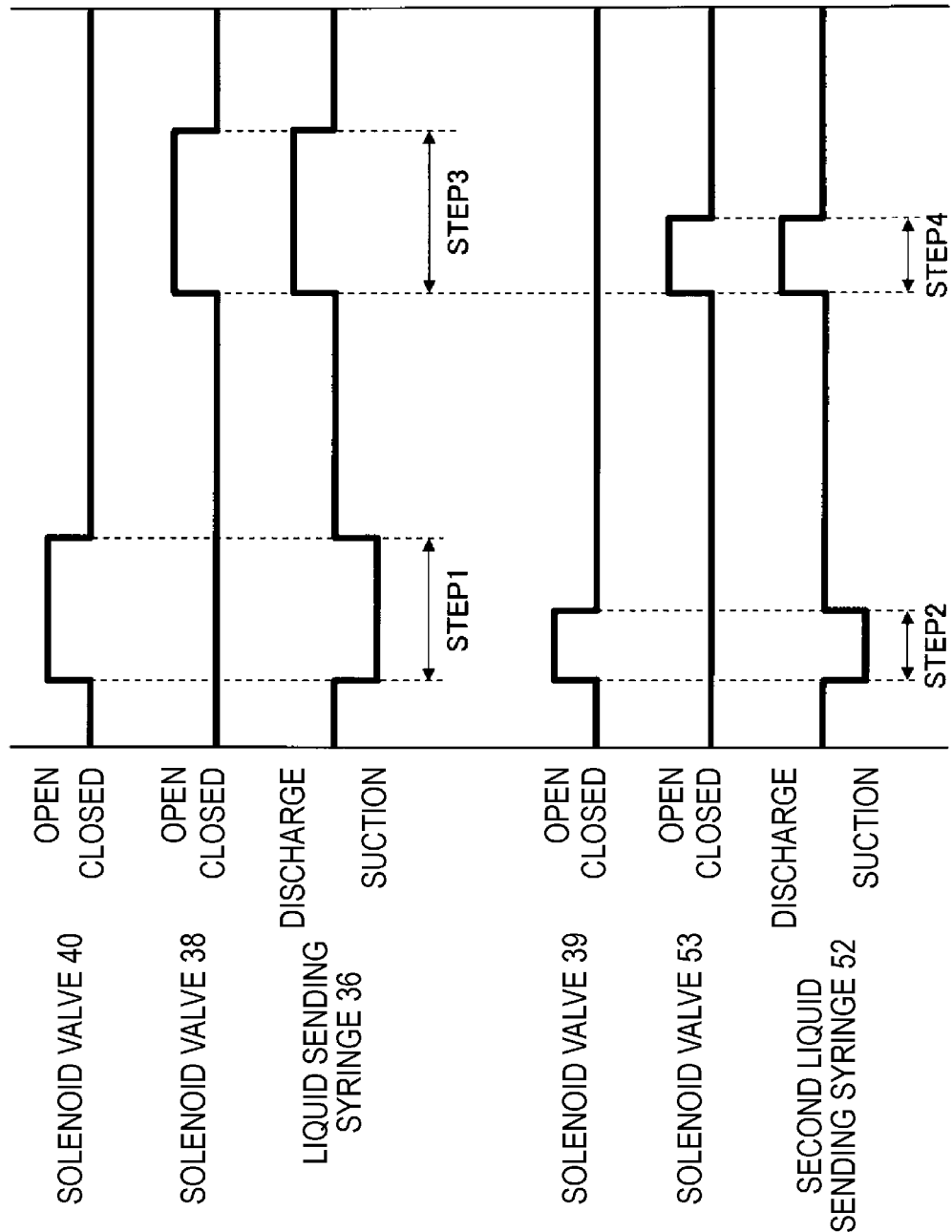
[FIG. 21]

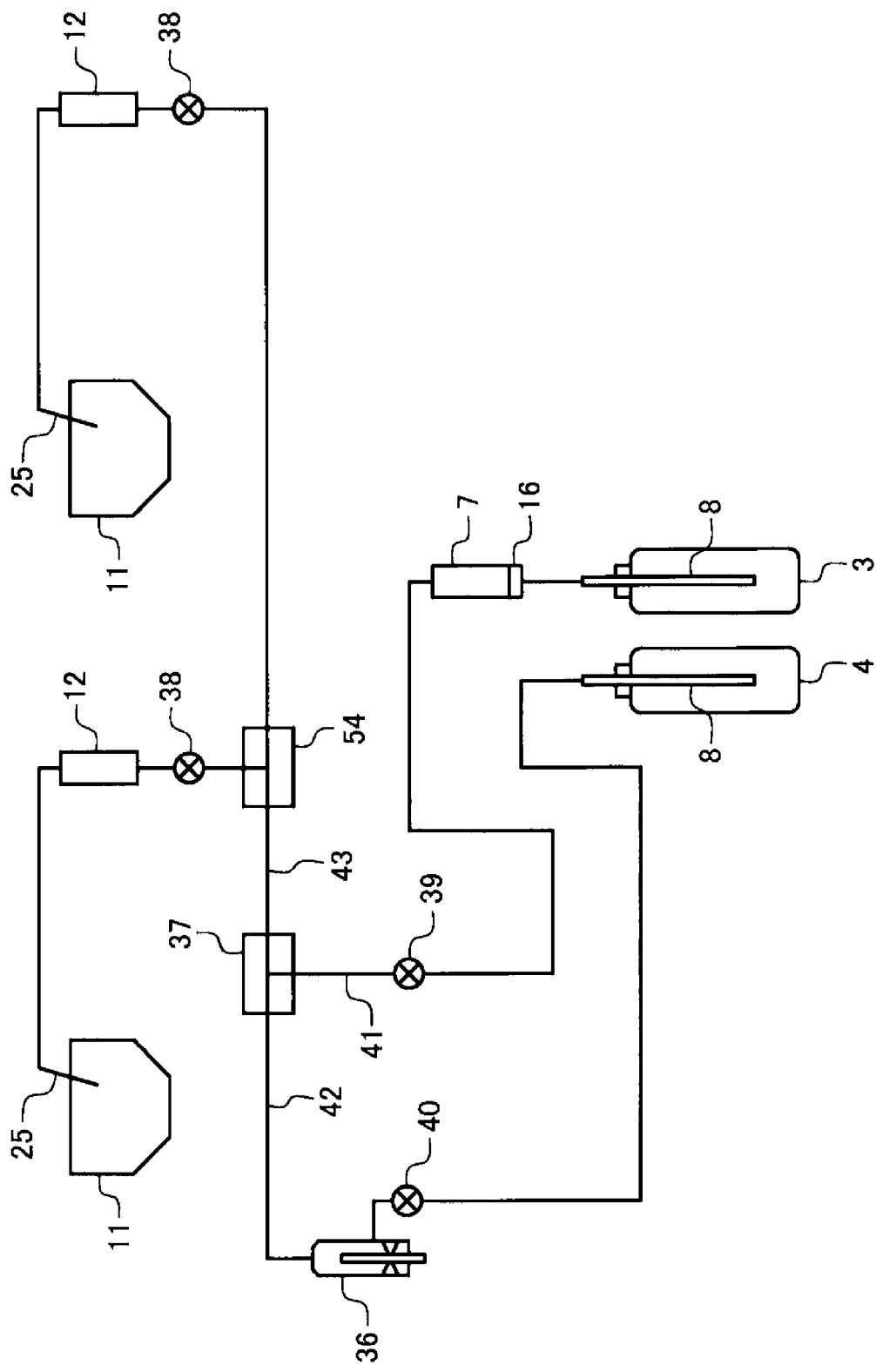

ELECTROLYTE ANALYSIS APPARATUS

TECHNICAL FIELD

The present invention relates to an electrolyte analysis apparatus.

BACKGROUND ART

An electrolyte analysis apparatus is a device for measuring a concentration of a specific electrolyte contained in an electrolyte solution such as blood and urine of a human body, and uses an ion selective electrode to measure the concentration. As the electrolyte analysis apparatus, for example, a flow-type electrolyte analysis apparatus is known. In the flow-type electrolyte analysis apparatus, a serum which is an electrolyte solution is directly supplied to, or a sample solution obtained by performing diluting with a specimen diluent is supplied to an ion selective electrode to measure a liquid junction potential between the ion selective electrode and a reference electrode solution. Next (or prior to the measurement), a standard solution having a known electrolyte concentration is supplied to the ion selective electrode, and a liquid junction potential between the reference electrode solution and the standard solution is measured in the same manner as the serum (or the sample solution). An electrolyte concentration of the serum (or sample solution) can be calculated based on two liquid junction potentials, that is, the liquid junction potential of the standard solution and the liquid junction potential of the serum (or the sample solution).

In the flow-type electrolyte analysis apparatus, reagents such as the specimen diluent, the standard solution, and the reference electrode solution are used as consumables, and quantities of these reagents used in one analysis depend on parameters that are optionally set. Since these reagents are supplied from reagent vessels (for example, 2 L bottles) that are individually replaceably disposed, the number and frequency of replacement of the reagent bottles increase as the number of testing devices and the number of test specimens increase, and the burden on an operator increases. In addition, when a device in the related art is continuously operated, a bottle needs to be replaced once every several hours, and the operator for the device is restrained to a time schedule of reagent bottle replacement. In particular, the standard solution is a reagent that serves as an analytical standard, and since a minute change in concentration influences an analytical value, it is necessary to calibrate again after bottle replacement. Downtime of the device caused by the bottle replacement, such as a bottle replacement work and the subsequent calibration, results in a substantial reduction in analytical throughput.

To solve the problem, for example, PTL 1 discloses a reagent preparation device including: a preparation tank that stores a reagent and a diluent; a reagent supply unit that supplies a predetermined quantity of reagent to the preparation tank; a diluent supply unit that supplies, to the preparation tank, a diluent of a quantity smaller than a quantity for diluting the supplied reagent to a desired concentration; a diluent replenishment unit that replenishes any quantity of diluent to the preparation tank; a detection unit that detects a concentration of the reagent in the tank; and a control unit that controls a replenishment operation of the diluent replenishment unit, in which the control unit repeatedly performs control, when the detected concentration of the reagent is higher than a desired concentration thereof, to calculate a replenishment quantity of the diluent for setting the concentration of the reagent to the desired concentration based on a difference between the detected concentration and the desired concentration, and to replenish the preparation tank with the diluent of a quantity less than the calculated replenishment quantity until the desired concentration is reached.

CITATION LIST

Patent Literature

PTL 1: JP-H-9-33538

SUMMARY OF INVENTION

Technical Problem

In the above-mentioned related art, a frequency of the bottle replacement is reduced by using a high-concentration reagent while diluting the high-concentration reagent. However, when the high-concentration reagent is diluted and used, in order to improve the accuracy of the concentration of the diluted reagent, a tank that holds the diluted reagent having a predetermined concentration, a detector that detects the concentration, a mechanism that mixes and stirs the diluted reagent, and the like are required, whereby a device configuration becomes complicated.

The invention has been made in view of the above problem, and an object of the invention is to provide an electrolyte analysis apparatus capable of diluting and preparing a reagent with higher accuracy with a simpler device configuration.

Solution to Problem

Although the present application includes a plurality of solutions to the above problem, one example thereof includes: a high-concentration reagent bottle configured to store a high-concentration reagent; a reagent diluent bottle configured to store a reagent diluent for diluting the high-concentration reagent; a first flow path configured to send the high-concentration reagent from the high-concentration reagent bottle; a second flow path configured to send the reagent diluent from the reagent diluent bottle; a junction unit configured to join the first flow path and the second flow path; a third flow path configured to send a prepared reagent which is a mixed liquid of the high-concentration reagent and the reagent diluent from the junction unit; a dilution tank configured to store the prepared reagent; a prepared reagent discharge nozzle configured to discharge the prepared reagent sent in the third flow path to the dilution tank; a liquid sending mechanism configured to send the high-concentration reagent and the reagent diluent to the junction unit at a predetermined ratio so that the prepared reagent discharged from the prepared reagent discharge nozzle to the dilution tank through the third flow path has a predetermined concentration; and an analysis unit configured to perform analysis with the prepared reagent stored in the dilution tank.

Advantageous Effects of Invention

A reagent can be diluted and prepared with higher accuracy with a simpler device configuration.

BRIEF DESCRIPTION OF DRAWINGS

FIG. 1 is a diagram schematically showing the entire configuration of an electrolyte analysis apparatus according to a first embodiment.

FIG. 2 is a diagram showing a reagent preparation unit according to the first embodiment together with related components.

FIG. 3 is a diagram schematically showing a reagent supply operation in one cycle of the reagent preparation unit.

FIG. 4 is a diagram schematically showing a state inside a third flow path 43 after a liquid sending operation.

FIG. 5 is a diagram schematically showing a change in concentration of a mixed liquid sent to the third flow path in a liquid sending process.

FIG. 6 is a diagram schematically showing the liquid behavior of a high-concentration reagent and a reagent diluent in the third flow path during the liquid sending operation.

FIG. 7 is a diagram showing a state of a sedimentation phenomenon when the third flow path is configured in a vertical direction immediately after a junction unit, as a comparative example with respect to the first embodiment.

FIG. 8 is a diagram showing a state of a sedimentation phenomenon when the third flow path is configured in a vertical direction immediately after the junction unit, as a comparative example with respect to the first embodiment.

FIG. 9 is a diagram schematically showing a configuration example of the third flow path.

FIG. 10 is a diagram showing an example of a liquid sending mechanism (liquid sending syringe) having a function of stirring an internal liquid in accordance with the liquid sending operation.

FIG. 11 is a diagram showing another example of the liquid sending mechanism (liquid sending syringe) having a function of stirring the internal liquid in accordance with the liquid sending operation.

FIG. 12 is a diagram showing another example of the liquid sending mechanism (liquid sending syringe) having a function of stirring the internal liquid in accordance with the liquid sending operation.

FIG. 13 is a diagram showing a modification of the junction unit.

FIG. 14 is a diagram showing another modification of the junction unit.

FIG. 15 is a schematic diagram of an operation sequence when a suction operation of the high-concentration reagent and a discharge operation to the third flow path are performed a plurality of times in one cycle.

FIG. 16 is a schematic diagram showing the reagent preparation unit provided with a flow path for disposal.

FIG. 17 is a diagram showing the liquid behavior of the high-concentration reagent at the junction unit during the discharge operation and after the end of the discharge operation.

FIG. 18 is a diagram showing the liquid behavior of the high-concentration reagent at the junction unit during the discharge operation and after the end of the discharge operation.

FIG. 19 is a diagram showing a reagent preparation unit according to a second embodiment together with related components.

FIG. 20 is a diagram schematically showing the liquid behavior of the high-concentration reagent and a reagent diluent in the third flow path during the liquid sending operation.

FIG. 21 is a schematic diagram showing an operation sequence according to the second embodiment.

FIG. 22 is a diagram showing a reagent preparation unit according to a third embodiment together with related components.

DESCRIPTION OF EMBODIMENTS

Hereinafter, embodiments of the invention will be described with reference to the drawings.

First Embodiment

A first embodiment of the invention will be described with reference to FIGS. 1 to 18.

FIG. 1 is a diagram schematically showing the entire configuration of an electrolyte analysis apparatus according to an embodiment of the invention. In the present embodiment, a flow-type electrolyte analysis apparatus (hereinafter, simply referred to as the electrolyte analysis apparatus) using an ion selective electrode (hereinafter, referred to as the ion selective electrode (ISE)) will be described as an example of the electrolyte analysis apparatus.

In FIG. 1, an electrolyte analysis apparatus 100 schematically includes a sample dispensing unit 101, an ISE electrode unit 102, a reagent unit 103, a reference electrode solution supply unit 104, a specimen diluent supply unit 105, a reagent preparation unit 106, a waste liquid mechanism 107, and a control device 29.

The sample dispensing unit 101 includes a sample probe 14 and a sample vessel 15. The sample probe 14 dispenses a sample (such as a patient specimen) held in the sample vessel 15 and transmits the sample into an automatic analysis device. Here, the specimen is a general term for analysis targets collected from a living body of a patient, and is, for example, blood or urine. The specimen may be obtained by performing a pretreatment on these analysis targets.

The ISE electrode unit 102 includes a dilution tank 11, a sipper nozzle 13, an ISE electrode 1, a reference electrode 2, a voltmeter 27, and an amplifier 28. The sample dispensed by the sample dispensing unit is discharged to the dilution tank 11, and is diluted and stirred with a specimen diluent discharged from a specimen diluent discharge nozzle 24 into the dilution tank 11. The sipper nozzle 13 is connected to the ISE electrode 1 by a flow path, and the diluted sample solution suctioned from the dilution tank 11 is sent to the ISE electrode 1 through the flow path. Here, the ISE electrode unit 102, together with the control device 29, constitutes an analysis unit that performs analysis of a sample with a prepared reagent stored in the dilution tank 11.

The reagent unit 103 includes reagents necessary for measurement, reagent bottles that store the reagents, and reagent suction nozzles 8 that suction the reagents from the reagent bottles. The reagent unit 103 may include degassing mechanisms 7 and filters 16. As the reagent for measuring an electrolyte, four types of liquids of a high-concentration reagent, a reagent diluent, a specimen diluent, and a reference electrode solution are used. In the present embodiment, for example, the high-concentration reagent is an internal standard solution having a concentration 31 times the normal concentration, and the reagent diluent is pure water.

The present embodiment shows an example in which a high-concentration reagent bottle 3 that stores the high-concentration reagent, a reagent diluent bottle 4 that stores the reagent diluent, a specimen diluent bottle 5 that stores the specimen diluent, and a reference electrode solution bottle 6 that stores the reference electrode solution are set in the reagent unit 103. The reagent diluent bottle 4 that stores the reagent diluent may be automatically supplied with pure water, and the replacement of the reagent diluent bottle 4 in an operation of the device can be eliminated. Further, when the device is cleaned, a cleaning solution bottle that stores a cleaning solution may be set in the reagent unit.

Each of the degassing mechanisms 7 is a mechanism that prevents bubbles from being supplied to the dilution tank 11 or the reference electrode 2 as they are when the bubbles appear in the reagent. In a syringe, a negative pressure is applied to the flow path for sending each reagent to suction up the reagent from each bottle, and therefore a gas dissolved in the reagent may appear as the bubbles in the reagent, but the degassing mechanism 7 suppresses the situation where the reagent is supplied to the dilution tank 11 and the reference electrode 2 with the bubbles contained therein to some extent.

Each of the filters 16 is a mechanism that traps impurities (dust and the like) contained in the reagent bottle.

The reference electrode solution supply unit 104 includes a sipper syringe 10, a pinch valve 23, and solenoid valves 17, 21, and 22, and performs a liquid sending operation of the reference electrode solution and a liquid sending operation of the sample solution to the ISE electrode. The reference electrode solution stored in the reference electrode solution bottle 6 is sent to the reference electrode 2 by operating the sipper syringe 10 in a state where the pinch valve 23 is closed. Thereafter, when the pinch valve 23 is opened, the diluted sample solution sent to the ISE electrode flow path and the reference electrode solution sent to the reference electrode flow path come into contact with each other, and the ISE electrode 1 and the reference electrode 2 are electrically conducted. The ISE electrode unit measures a concentration of a specific electrolyte contained in the sample based on a potential difference (liquid junction potential) between the ISE electrode 1 and the reference electrode 2.

Specifically, the ISE electrode 1 is attached with an ion sensitive membrane having a property that an electromotive force changes according to a concentration of a specific ion (for example, sodium ion (Na+), potassium ion (K+), chlorate ion (Cl−), and the like) in the sample solution. Accordingly, the ISE electrode 1 outputs an electromotive force according to a concentration of each ion in the sample solution, and the voltmeter 27 and the amplifier 28 acquire the electromotive force between the ISE electrode 1 and the reference electrode 2. The control device 29 calculates the concentration of the ion in the specimen based on the acquired electromotive force for each ion, and outputs (for example, displays) the concentration. The sample solution remaining in the dilution tank 11 is discharged by a waste liquid mechanism to be described later.

The specimen diluent supply unit 105 includes a specimen diluent syringe 9, solenoid valves 18, 20, and the specimen diluent discharge nozzle 24. The specimen diluent discharge nozzle 24 is provided in a shape in which a tip thereof is introduced into the dilution tank 11, and is connected to the specimen diluent bottle 5 through the flow path. A preheating 12 may be provided in the flow path. The preheating 12 is a mechanism that reduces the influence of a temperature on the ISE electrode 1 by controlling a temperature of the reagent reaching the ISE electrode 1 within a certain range.

The reagent preparation unit 106 has a function of diluting the high-concentration reagent contained in the high-concentration reagent bottle 3 and the reagent diluent contained in the reagent diluent bottle 4 by mixing the high-concentration reagent and the reagent diluent, and preparing the diluted reagent to a predetermined concentration to generate a reagent (prepared reagent). A detailed configuration and an operation of the reagent preparation unit 106 will be described in detail later.

The waste liquid mechanism includes a first waste liquid nozzle 26, a second waste liquid nozzle 30, a vacuum bottle 34, a waste liquid receiver 35, a vacuum pump 33, and solenoid valves 31, 32, and discharges the sample solution remaining in the dilution tank 11 and a reaction solution remaining in the flow path of the ISE electrode unit 102.

Although not shown in the drawings, the control device 29 controls the entire operation of the electrolyte analysis apparatus, and can be implemented by a computer that includes a calculation unit such as a central processing unit (CPU), a storage unit such as a random access memory (RAM), and an input and output unit such as an I/O port. The storage unit and the input and output unit are configured such that data can be exchanged with the calculation unit via an internal bus or the like. The input and output unit are connected to each of the above-mentioned mechanisms of the electrolyte analysis apparatus, and the control device 29 controls an operation of each of the mechanisms via the input and output unit. The storage unit may store a program that defines an operation of the electrolyte analysis apparatus, and the control device 29 may control the operation of the electrolyte analysis apparatus by executing the program. The program is read into the storage unit and executed by the calculation unit. An input and output device may be connected to the control device 29, and the electrolyte analysis apparatus may execute an input from a user or display of a measurement result by the input and output device.

Here, a basic measurement operation of the electrolyte concentration in the electrolyte analysis apparatus 100 will be described.

The measurement operation in the electrolyte analysis apparatus 100 is controlled by the control device 29. First, the control device 29 discharges the sample dispensed from the sample vessel 15 by the sample probe 14 of the sample dispensing unit to the dilution tank 11 of the ISE electrode unit. Then, the specimen diluent is discharged from the specimen diluent bottle 5 to the dilution tank 11 via the specimen diluent discharge nozzle 24 by an operation of the specimen diluent syringe 9. In the dilution tank 11, the sample is diluted with the specimen diluent. As described above, in order to prevent bubbles from being generated due to changes in a temperature and a pressure of the specimen diluent in the flow path, the degassing mechanism 7 attached in a middle of a specimen diluent flow path may perform a degassing process. The diluted sample solution is sent to the ISE electrode 1 by an operation of the sipper syringe 10.

On the other hand, the reference electrode solution is sent from the reference electrode solution bottle 6 to the reference electrode 2 by operations of the pinch valve 23 and the sipper syringe 10. After the reference electrode solution is sent, the pinch valve 23 is opened and the sample solution and the reference electrode solution come into contact with each other, so that the ISE electrode 1 and the reference electrode 2 are electrically conducted. An ISE electrode potential (liquid junction potential) with reference to a reference electrode potential is measured using the voltmeter 27 and the amplifier 28.

In order to reduce the influence of the concentration change during the sending of the sample solution, it is desirable to set the electrolyte concentration of the reference electrode solution to a high concentration. The reference electrode solution is, for example, a potassium chloride (KCl) aqueous solution having a predetermined concentration. On the other hand, the solution may crystallize and cause clogging of the flow path when the concentration is near a saturation concentration. In consideration of these points comprehensively, the electrolyte concentration of the reference electrode solution may be preferably between 0.5 mmol/L and 3.0 mmol/L.

Before or after the measurement using the sample solution, the electrolyte concentration of the internal standard solution is measured in the same manner as the measurement using the sample solution. In the present embodiment, the internal standard solution is prepared by diluting the high-concentration reagent in a reagent preparation unit. A specific operation of the reagent preparation unit will be described later.

The control device 29 executes calculation by using the ISE electrode potential measured for the sample solution to calculate the electrolyte concentration in the sample solution. At this time, by performing calibration based on the ISE electrode potential measured for the internal standard solution, the electrolyte concentration can be more accurately measured. Specific calculation contents of the calibration processing can be appropriately designed by those skilled in the art based on a well-known technique and the like.

A series of analyses including the dispensing of the specimen, the electrolyte measurement of the specimen, and the electrolyte measurement of the internal standard solution performed before and after that are defined as one cycle, one specimen is processed per cycle, and a plurality of specimens are subjected to an electrolyte analysis by repeating the cycle.

Subsequently, the reagent preparation unit 106 of the electrolyte analysis apparatus 100 will be described in detail.

FIG. 2 is a diagram showing the reagent preparation unit together with related components.

The reagent preparation unit 106 includes: a first flow path 41 that sends the high-concentration reagent from the high-concentration reagent bottle 3; a second flow path 42 that sends the reagent diluent from the reagent diluent bottle 4; a junction unit 37 that joins the first flow path 41 and the second flow path 42; a third flow path 43 that sends a prepared reagent which is a mixed liquid of the high-concentration reagent and the reagent diluent from the junction unit 37; the dilution tank 11 that stores the prepared reagent; a prepared reagent discharge nozzle 25 that discharges the prepared reagent sent in the third flow path 43 to the dilution tank 11; a liquid sending syringe 36 that constitutes a liquid sending mechanism that sends the high-concentration reagent and the reagent diluent to the junction unit 37; and solenoid valves 38, 39, and 40. The preheating 12 is provided in the third flow path 43.

The liquid sending syringe 36 is provided in the second flow path 42. The junction unit 37 has a single branch point. The first flow path 41, the second flow path 42, and the third flow path 43 which are connected to the junction unit 37 are connected by connectors. The junction unit 37 is made of a material having excellent chemical resistance, such as acrylic or vinyl chloride. The first flow path 41, the second flow path 42, and the third flow path 43 are formed by using, for example, a resin tube having a flow path inner diameter of 1 mm.

The reagent preparation unit 106 includes one liquid sending mechanism (liquid sending syringe 36) in the flow path. By the operations of the liquid sending syringe 36 and the solenoid valves 38, 39, and 40, the high-concentration reagent is sent from the first flow path 41 to the junction unit 37, the reagent diluent is sent from the second flow path 42 to the junction unit 37, and the mixed liquid of the high-concentration reagent and the reagent diluent is sent from the junction unit 37 to the third flow path 43. The mixed liquid of the high-concentration reagent and the reagent diluent is mixed in the third flow path 43, and finally, a predetermined quantity (a liquid sending quantity for one cycle) of the mixed liquid is discharged as the prepared reagent from the prepared reagent discharge nozzle 25 to the dilution tank 11. The reagent discharged to the dilution tank 11 is stirred in the dilution tank 11 by the momentum of the discharged reagent, and then used for analysis by the analysis unit (ISE electrode unit 102).

Here, a liquid sending operation of the reagent in the reagent preparation unit according to the present embodiment will be specifically described.

FIG. 3 is a diagram schematically showing a reagent supply operation in one cycle of the reagent preparation unit, and time is shown on a horizontal axis.

As shown in FIG. 3, first, the high-concentration reagent is suctioned from the first flow path 41 into the second flow path 42 by performing the suction operation of the liquid sending syringe 36 with the solenoid valve 39 open (STEP 1). Thereafter, the reagent diluent is introduced from the reagent diluent bottle 4 into the second flow path 42 by performing the suction operation of the liquid sending syringe 36 with the solenoid valve 40 open (STEP 2). Thereafter, the high-concentration reagent and the reagent diluent are sent to the third flow path 43 by performing a discharge operation of the liquid sending syringe 36 with the solenoid valve 38 open. The mixed liquid (hereinafter, simply referred to as a mixed liquid) of the high-concentration reagent and the reagent diluent corresponding to the liquid sending quantity is discharged from the prepared reagent discharge nozzle 25 to the dilution tank 11 in the form of being pushed by the high-concentration reagent and the reagent diluent sent to the third flow path 43 (STEP 3). The above procedure is performed for each analysis (one cycle). The order of STEP 1 and STEP 2 may be reversed. Thus, in the present embodiment, the high-concentration reagent and the reagent diluent are alternately sent to the third flow path 43 once in one cycle.

FIG. 4 is a diagram schematically showing a state inside the third flow path 43 after the liquid sending operation.

When the liquid sending operation is performed in the reagent preparation unit 106, the high-concentration reagent and the reagent diluent are alternately supplied to the third flow path 43 through the junction unit 37. When, for example, an internal standard solution concentrated to 31 times is used as a high-concentration reagent, in order to finally prepare an internal standard solution (prepared reagent) having a normal concentration (one time), it is necessary to send the reagent diluent in a quantity 30 times the quantity of the high-concentration reagent. In the present embodiment, for example, 15 µL of a high-concentration reagent is sent to the junction unit 37, 450 µL of a reagent diluent is sent to the junction unit 37 with respect to the high-concentration reagent, and 465 µL of a mixed liquid (prepared reagent) of the high-concentration reagent and the reagent diluent is discharged to the dilution tank 11 in the form of being pushed out by the liquid sending operation of the high-concentration reagent and the reagent diluted solution to the third flow path 43 through the junction unit 37. That is, the liquid sending mechanism (liquid sending syringe 36) performs the liquid sending operation so that the concentration of the prepared reagent discharged from the prepared reagent discharge nozzle 25 to the dilution tank 11 through the third flow path 43 becomes a predetermined concentration under the control of the control device 29.

FIG. 5 is a diagram schematically showing a change in concentration of a mixed liquid sent to the third flow path in a liquid sending process. FIG. 6 is a diagram schematically showing the liquid behavior of the high-concentration reagent and the reagent diluent in the third flow path during the liquid sending operation.

As shown in FIG. 6, during the liquid sending operation, the fluid in the vicinity of the inner wall surface of a pipe has a moving speed slower than that of the fluid in the vicinity of the center of the pipe due to a wall surface resistance of the pipe, so that the liquid in the vicinity of the inner wall surface is overtaken by the subsequent liquid in the vicinity of the center of the pipe. That is, the high-concentration reagent and the reagent diluent that are alternately sent to the third flow path 43 through the junction unit 37 are mixed in the third flow path 43 by a flow (for example, turbulent flow) different from a liquid sending direction generated by a difference in the moving speed between the vicinity of the inner wall surface and the vicinity of the center of the pipe. During the liquid sending operation, since there is a difference in the moving speed between the fluid in the vicinity of the wall surface and the fluid in the vicinity of the center of the pipe, a boundary between the high-concentration reagent and the reagent diluent that are alternately sent to the third flow path 43 is stretched in the liquid sending direction, and a contact area between the high-concentration reagent and the reagent diluted solution is increased. Accordingly, a diffusion effect (diffusion effect of the high-concentration reagent into the reagent diluent) in a contact portion between the high-concentration reagent and the reagent diluent is enhanced, and the mixing of the high-concentration reagent and the reagent diluent is further promoted. Based on two new findings obtained by the inventors of the present application, the magnitude of a mixing effect of the high-concentration reagent and the reagent diluent depends on a length of a liquid sending flow path, and the longer the liquid sending flow path is, the more the mixing of the high-concentration reagent and the reagent diluent is promoted, so that the longer the liquid sending flow path (here, the third flow path 43) is, the more uniform the mixed liquid (prepared reagent) can be obtained.

In FIG. 5, the concentration of the high-concentration reagent is a concentration A, the concentration of the reagent diluent is a concentration C, a target concentration is a concentration B, and the concentration in each cross-section of the third flow path 43 is shown. As shown in FIG. 5, on an upstream side of the third flow path 43 (immediately after the junction unit 37), the high-concentration reagent and the reagent diluent are not sufficiently mixed, and there is a large difference in concentration, but the mixing in the flow path is promoted each time the liquid sending process is performed, and finally the concentration becomes uniform.

Even when the mixed liquid sent to the third flow path 43 is not sufficiently mixed, the mixed liquid does not need to have a continuously uniform concentration as long as the mixed liquid has a constant concentration for each volume of a quantity for one analysis. That is, since it is sufficient that the concentration of the mixed liquid finally discharged into the dilution tank 11 is constant for each analysis, the mixed liquid immediately before being discharged may be in a state in which a difference in concentration between a high-concentration portion and a low-concentration portion is large (a state in which concentration unevenness occurs). However, in order to obtain higher accuracy, it is desirable that the two liquids sent to the third flow path 43 are sufficiently mixed at a stage before discharge and have a uniform concentration. This is because the sufficient mixing can reduce variation in the quantity of the high-concentration reagent contained in a volume of the quantity for one analysis. When the mixed liquid is sufficiently mixed, the concentration is not influenced even if the quantity of the mixed liquid discharged into the dilution tank varies to some extent, so that the stability of the concentration can be increased.

In view of the above, since a mixing process in the third flow path 43 depends on a length of the flow path, it is desirable to increase a length of the third flow path 43 as large as possible. By increasing the length of the third flow path 43, it is possible to realize a state in which the mixed liquid is sufficiently mixed at the stage before discharge. In addition, when the length of the third flow path 43 is increased, for example, other factors influencing the variation of the concentration, such as variation in a suction quantity of the high-concentration reagent, can be made uniform by the mixing process in the flow path, and the reproducibility of the concentration of the mixed liquid finally discharged to the dilution tank 11 can be ensured. However, when the length of the flow path is increased too large, the pipe resistance may exceed a driving force of the liquid sending mechanism, and liquid sending may not be possible. In addition, when the length of the flow path is increased, even if the same discharge operation is performed, a pressure in the pipe during the discharge operation increases, and there is a concern that the pressure may exceed a pressure resistance range of a flow path part (for example, a solenoid valve or a pipe tube). Therefore, the length of the flow path may be large enough to obtain the reproducibility of the required measurement result, which can be appropriately optimized by those skilled in the art for each target value of the measurement result in a configuration of a target device. In the electrolyte analysis, since the temperature stability of a measurement reagent has a large influence on an analysis result, when the length of the flow path is increased, it is desirable to increase a length of a flow path before passing through the preheating among the flow path from the junction unit 37 to a discharge port of the prepared reagent discharge nozzle 25.

Here, a sedimentation phenomenon of the high-concentration reagent in the third flow path 43 will be described.

In the third flow path 43, immediately after the liquid is sent, the high-concentration portion and the low-concentration portion (reagent diluent portion) are clearly separated, and are in a state where the mixing is not sufficient. When time elapses in this state, since the high-concentration reagent has a higher specific gravity than the reagent diluent, the high-concentration reagent settles downward due to a difference in the specific gravity. When the mixed liquid of the high-concentration reagent and the reagent diluent is retained in the flow path in an insufficiently mixed state, the mixed liquid is sufficiently mixed after a long period of time due to natural diffusion of the high-concentration reagent. However, since a diffusion rate of the natural diffusion is far slower than a sedimentation rate, in practice, the influence of the natural diffusion can be ignored, and conversely, sedimentation cannot be ignored because the sedimentation phenomenon is observed even in a short time of several seconds to several tens of seconds after the settling of the liquid.

FIGS. 7 and 8 are diagrams showing a state of a sedimentation phenomenon when the third flow path is configured in a vertical direction immediately after a junction unit, as a comparative example with respect to the present embodiment.

In a case of configurations as shown in FIGS. 7 and 8, the influence of the sedimentation is particularly remarkable, and the high-concentration reagent settles downward, so that a deviation occurs between liquid sending patterns of the high-concentration portion and the low-concentration portion. As a result, when the mixed liquid is finally discharged to the dilution tank 11, a reagent having a low (or high) concentration is discharged first, and then a reagent having a high (or low) concentration is discharged, so that a reagent having a constant concentration cannot be prepared in each measurement. When the analysis is continuously performed, that is, when the analysis is always performed at the same time interval, even if the sedimentation phenomenon occurs, the same sedimentation state occurs every time, so that the sedimentation phenomenon does not matter. However, since the measurement interval is generally irregular in an actual operation of the device, and when the device is once in a standby state, the time interval of the operation is longer than that when the measurement operation is performed reliably and continuously, the influence of the sedimentation phenomenon cannot be ignored.

FIG. 9 is a diagram schematically showing a configuration example of the third flow path.

In FIG. 9, the third flow path 43 has a winding structure wound in a spiral shape with a predetermined radius. Accordingly, it is possible to reduce the influence of the sedimentation of the high-concentration reagent. With such a configuration, even if the sedimentation phenomenon occurs, the high-concentration reagent settles at a lower position in one wound circumference, and further progress of the sedimentation phenomenon can be prevented. Accordingly, even if operating time irregularly changes, the sedimentation state can be kept in the same manner to a certain extent, whereby the liquid sending pattern can be maintained. As shown in FIG. 9, it is desirable that a winding direction is such that a rotation axis is oriented in a horizontal direction (that is, the inclination in the vertical direction is periodically repeated when the liquid travels in a flow path direction). It is desirable that a winding diameter is determined such that the volume of the flow path in one round is equal to or less than a quantity of liquid sent in one cycle. Although the entire third flow path 43 may have a winding structure, the sedimentation phenomenon of the high-concentration reagent is mainly significant in a region where the difference in the concentrations between the high-concentration portion and the low-concentration portion is large, that is, in a region immediately after the junction unit 37 of the third flow path 43, and therefore only the region of the third flow path 43 may be partially wound.

In consideration of the sedimentation phenomenon, it is desirable that the liquid sending mechanism (here, the liquid sending syringe 36) provided in the reagent preparation unit 106 is provided in either the first flow path 41 or the second flow path 42. This is to suppress the occurrence of sedimentation of the high-concentration reagent inside the liquid sending mechanism by minimizing the number of the liquid sending mechanisms as much as possible in which the sedimentation phenomenon easily occurs due to retention of the mixed liquid of the high-concentration reagent and the reagent diluent inside.

When the liquid sending mechanism is provided in the third flow path 43, it is desirable to provide the liquid sending mechanism immediately before the prepared reagent discharge nozzle 25 (discharge port). As a result, since the mixed liquid introduced into the third flow path 43 is mixed as much as possible in the flow path before reaching the liquid sending mechanism, it is possible to reduce the influence of the sedimentation of the high-concentration component in the mixed liquid introduced into the liquid sending mechanism.

FIG. 10 is a diagram showing an example of the liquid sending mechanism (liquid sending syringe) having a function of stirring an internal liquid in accordance with the liquid sending operation. FIGS. 11 and 12 are diagrams showing another example of the liquid sending mechanism (liquid sending syringe) having a function of stirring the internal liquid in accordance with the liquid sending operation.

In the liquid sending mechanism (liquid sending syringe) shown in FIG. 10, the liquid is sent by operating a cylindrical drive plunger 44 by a drive motor (not shown), but since a cylindrical part 45 having a radius larger than the radius of the drive plunger 44 is provided at the tip of the drive plunger 44, it is possible to stir the liquid inside the liquid sending mechanism in accordance with the liquid sending operation.

The liquid sending mechanism (liquid sending syringe) shown in FIGS. 11 and 12 includes a propeller part 47 having a radius larger than the radius of the drive plunger 44 at the tip of the drive plunger 44, and a bearing 46 for holding the propeller part 47 so as to be slidable in a circumferential direction with respect to the drive plunger 44. FIG. 12 is a view of the drive plunger 44, the bearing 46, and the propeller part 47 as viewed from an axial direction. With such a configuration, since the propeller part 47 is rotated due to an operation of the drive plunger 44 during the liquid sending operation, it is possible to stir the liquid inside more effectively.

Thus, in a case in which the inside of the liquid sending mechanism is stirred in accordance with the liquid sending operation, by attaching the liquid sending mechanism to the third flow path 43 immediately after the junction unit 37, it is possible to quickly mix the high-concentration reagent and the reagent diluent which are sent to the third flow path 43. A shape of the drive plunger 44 and shapes of additional parts or the like for stirring the inside of the liquid sending mechanism are not limited to the above examples, and can be appropriately selected by those skilled in the art within a range in which an effect of promoting the mixing of the high-concentration reagent and the reagent diluent is exerted.

In consideration of the sedimentation phenomenon, in the junction unit 37, it is desirable that the second flow path 42 (and the third flow path 43) that sends the reagent diluent is connected above the first flow path 41 that sends the high-concentration reagent, in other words, a high-concentration side is connected below a low-concentration side. For example, in the present embodiment, as a configuration that satisfies the above conditions, the junction unit 37 having a shape (that is, T shape: refer to FIG. 4 and the like) in which the first flow path 41 that sends the high-concentration reagent is connected vertically downward, and the second flow path 42 (and the third flow path 43) that sends the reagent diluent is connected above a connection portion with the first flow path 41 from the horizontal direction is exemplified. Thus, when the device is not operating (when the reagent preparation unit 106 is not operating), it is possible to prevent the high-concentration reagent from settling and leaking from the second flow path 42 to the first flow path 41 and the third flow path 43.

FIG. 13 is a diagram showing a modification of the junction unit.

In FIG. 13, a junction unit 48 has a plurality of branch points. Since the junction unit 48 has the plurality of branch points, when the high-concentration reagent is suctioned (sent) to the junction unit 48, the high-concentration reagent is suctioned simultaneously from the plurality of branch points. Therefore, the high-concentration reagent and the reagent diluent are alternately sent at short intervals, and the high-concentration reagent and the reagent diluent can be more quickly mixed. The junction unit 48 and each flow path are connected by the connectors.

FIG. 14 is a diagram showing another modification of the junction unit.

FIG. 14 shows a configuration including a plurality of junction units 37, each of which is single. In this case, the mixing can be promoted similarly to the case in FIG. 13.

In order to promote the mixing in the third flow path 43, a suction operation of the high-concentration reagent and a discharge operation to the third flow path 43 may be performed a plurality of times in one cycle.

FIG. 15 is a schematic diagram of an operation sequence when the suction operation of the high-concentration reagent and the discharge operation to the third flow path are performed the plurality of times in one cycle.

In the case shown in FIG. 15, first, the reagent diluent is suctioned from the reagent diluent bottle 4 to the second flow path 42 by performing the suction operation of the liquid sending syringe 36 with the solenoid valve 40 open (STEP 1). Thereafter, the high-concentration reagent is suctioned from the first flow path 41 into the second flow path 42 by performing the suction operation of the liquid sending syringe 36 with the solenoid valve 39 open (STEP 2). A suction quantity at this time is set to be less than or equal to the required quantity (for example, 50% of the required quantity is suctioned). Then, the discharge operation of the liquid sending syringe 36 is performed with the solenoid valve 39 open (STEP 3). A discharge quantity at this time is also set to be equal to or less than the required quantity (for example, 50% of the required quantity is discharged). Then, STEP 2 and STEP 3 are performed again, and all the remaining required quantities are suctioned and discharged (STEP 4, STEP 5). Since the high-concentration reagent and the reagent diluent are alternately sent at short intervals by operating in this manner, an effect of promoting the mixing is exerted. STEP 2 and STEP 3 can be repeated a plurality of times in one cycle, and the number of repetitions can be appropriately optimized by those skilled in the art.

Here, a case in which an error occurs in the present embodiment will be considered. In the present embodiment, the high-concentration reagent and the reagent diluent are sent to the third flow path 43 at a constant interval (constant pattern). Therefore, when an error suddenly occurs during the operation and the operation of the syringe is stopped halfway, the liquid sending pattern is disturbed. In this case, it is necessary to discard the liquid in a region where the pattern is disturbed, and to perform a refresh operation for filling the entire third flow path 43 with a new reagent (mixed liquid of the high-concentration reagent and the reagent diluent). However, in particular, when the length of the third flow path 43 is increased, the refresh operation takes time and the consumption of the reagent for refreshing is also required. Therefore, in order to shorten the time required for the refresh operation and reduce the consumption of the reagent for refreshing, the reagent preparation unit may be provided with a flow path for disposal.

FIG. 16 is a schematic diagram showing the reagent preparation unit provided with the flow path for disposal.

In FIG. 16, the reagent preparation unit 106 includes a disposal branch unit 49 disposed in the third flow path 43, a fourth flow path 50 branched and connected from the disposal branch unit 49, and a solenoid valve 51 that switches a liquid sending destination to a waste liquid flow path. During normal operation, the solenoid valve 51 is closed and the liquid is not sent to the fourth flow path 50. When an error occurs, as a subsequent refresh operation, the liquid is sent in a state where the solenoid valve 38 is closed and the solenoid valve 51 is opened. At this time, the control device 29 monitors and grasps the liquid sending quantity sent by the liquid sending mechanism before and after the error occurs, and the liquid in only the region where the liquid sending pattern is disturbed is sent to the fourth flow path 50 and discarded. Thus, by discarding the liquid in only the region where the liquid sending pattern is disturbed, the disposal branch unit 49 can reduce the number of cycles required for the refresh operation.

When the disposal branch unit 49 and the fourth flow path 50 are provided, it is desirable that a pipe resistance of the fourth flow path 50 viewed from the disposal branch unit 49 and a pipe resistance of the third flow path 43 after the disposal branch unit 49 are equal to each other. Accordingly, at the junction unit 37 after the discharge operation, a quantity of the high-concentration reagent leaking from the first flow path 41 can be controlled to be constant.

FIGS. 17 and 18 are diagrams showing the liquid behavior of the high-concentration reagent at the junction unit during the discharge operation and after the end of the discharge operation.

As shown in FIGS. 17 and 18, during the discharge operation, since the solenoid valve 39 is closed, no flow is generated in the first flow path 41. However, since the first flow path 41 receives a dynamic pressure of the fluid flowing from the second flow path 42 toward the third flow path 43 during the discharge operation, the high-concentration reagent in the first flow path 41 is slightly pushed into the liquid being sent (mainly the reagent diluent). Although the pushed reagent from the first flow path 41 returns to an original state after the end of the discharge operation, the high-concentration reagent leaks from the branch point of the junction unit 37 due to the reaction when pushed. This leakage quantity is caused by the dynamic pressure received by the first flow path 41 during the discharge operation, the larger the pressure is, the stronger a pushing force is, and therefore, the leakage quantity increases as the reaction. When a discharge speed (drive speed of the liquid sending syringe 36) is the same, the larger a pipe resistance of a discharge flow path is, the larger the dynamic pressure received by the first flow path 41 during the discharge operation is. That is, the leakage quantity depends on the pipe resistance of the discharge flow path, and when the liquid is sent to the flow paths having different pipe resistances, the leakage quantity of the high-concentration reagent from the first flow path 41 in the junction unit 37 after the discharge operation changes. There is no problem when the leakage quantity is always the same, but when the leakage quantity is sometimes different, the reproducibility of the concentration of the final reagent cannot be ensured. Therefore, by setting the pipe resistance of the fourth flow path 50 to be equal to the pipe resistance of the third flow path 43 after the disposal branch unit 49, it is possible to match the leakage quantity of the high-concentration reagent component after the discharge operation. Here, to set the pipe resistance to be equal, the fourth flow path 50 may simply have the same configuration as that of the third flow path 43 subsequent to the disposal branch unit 49. Even not in this way, for example, when the length of the fourth flow path is much smaller than the length of the third flow path 43, since the fourth flow path has a smaller pipe resistance than the third flow path 43, the pipe resistances may be matched by, for example, providing a throttle in the fourth flow path.

In the present embodiment configured as described above, a reagent can be diluted and prepared with higher accuracy with a simpler device configuration.

Second Embodiment

A second embodiment of the invention will be described with reference to FIGS. 19 to 21.

The present embodiment shows a case in which a liquid sending mechanism (liquid sending syringe) is arranged in each of the first flow path 41 that sends the high-concentration reagent of the reagent preparation unit 106 and the second flow path 42 that sends the reagent diluent.

FIG. 19 is a diagram showing a reagent preparation unit according to the present embodiment together with related components. In the drawing, the same members as those of the first embodiment are denoted by the same reference numerals, and descriptions thereof will be omitted.

In FIG. 19, the reagent preparation unit 106 includes: the prepared reagent discharge nozzle 25 that discharges the reagent to the dilution tank 11; the junction unit 37 which is a boundary between a high-concentration reagent flow path and a reagent diluent flow path; the first flow path 41 that is laid from the junction unit 37 to the high-concentration reagent bottle 3; the second flow path 42 that is laid from the junction unit 37 to the reagent diluent bottle 4; the third flow path 43 that is laid from the junction unit 37 to the prepared reagent discharge nozzle 25; the liquid sending syringe 36 provided in the first flow path 41; a second liquid sending syringe 52 provided in the second flow path 42; and the solenoid valve 51.

In the present embodiment, since the respective reagents are simultaneously sent from the first flow path 41 and the second flow path 42 to the third flow path 43 by simultaneously operating the two liquid sending mechanisms (the liquid sending syringes 36, 52), the high-concentration reagent and the reagent diluent can be mixed at the branch point of the junction unit 37. Therefore, the reagent mixed immediately after the junction unit 37 can be prepared.

FIG. 20 is a diagram schematically showing the liquid behavior of the high-concentration reagent and the reagent diluent in the third flow path during the liquid sending operation.

As shown in FIG. 20, during the liquid sending operation, the high-concentration reagent sent from the first flow path 41 to the third flow path 43 and the reagent diluent simultaneously sent from the second flow path 42 are sequentially sent to a downstream side. At this time, a boundary between the high-concentration reagent and the reagent diluent that are simultaneously sent to the third flow path 43 is stretched in the liquid sending direction, and the contact area between the high-concentration reagent and the reagent diluent is increased. Accordingly, the diffusion effect (diffusion effect of the high-concentration reagent into the reagent diluent) in the contact portion between the high-concentration reagent and the reagent diluent is enhanced, and the mixing of the high-concentration reagent and the reagent diluent is further promoted. That is, the magnitude of the mixing effect of the high-concentration reagent and the reagent diluent depends on the length of the liquid sending flow path, and the longer the liquid sending flow path is, the more the mixing of the high-concentration reagent and the reagent diluent is promoted, so that the longer the liquid sending flow path (here, the third flow path 43) is, the more uniform the mixed liquid (prepared reagent) can be obtained.

FIG. 21 is a schematic diagram showing an operation sequence according to the present embodiment.

In FIG. 21, first, the control device 29 controls the liquid sending syringe 36 to perform the suction operation with the solenoid valve 40 open, so that the reagent diluent is suctioned from the reagent diluent bottle 4 (STEP 1). On the other hand, the high-concentration reagent is suctioned from the high-concentration reagent bottle 3 by performing the suction operation of the second liquid sending syringe 52 with the solenoid valve 39 open (STEP 2). Either STEP 1 or STEP 2 may be performed first, and STEP 1 and STEP 2 may be simultaneously started. After the suction operation is completed, the discharge operation of the liquid sending syringe 36 is performed with the solenoid valve 38 open (STEP 3). On the other hand, the discharge operation of the liquid sending syringe 52 is performed with the solenoid valve 53 open (STEP 4). By simultaneously starting the operation of STEP 3 and STEP 4, at the branch point of the junction unit 37, the liquids simultaneously flow in from the first flow path 41 and the second flow path 42, and are sent to the third flow path 43, so that both liquids are mixed at the branch point.

In the present embodiment, the liquid sending quantity is 450 µL of the reagent diluent with respect to 15 µL of the high-concentration reagent, and driving quantities of the two liquid sending mechanisms (liquid sending syringes 36, 52) are greatly different. Accordingly, when the two liquid sending mechanisms (the liquid sending syringes 36, 52) are simultaneously started to operate, if the drive speeds are the same, the operation of the liquid sending mechanism provided in the first flow path 41 ends earlier. This means that the mixed liquid of the high-concentration reagent and the reagent diluent is sent from the branch point immediately after the start of the liquid sending, but only the reagent diluent is sent after the sending of the high-concentration reagent is completed. Therefore, the mixing in the flow path can be further promoted by adjusting liquid sending speeds of the two liquid sending mechanisms (the liquid sending syringes 36, 52) to always send the high-concentration reagent and the reagent diluent simultaneously.

In the present embodiment, the junction unit 37 may be disposed immediately before the prepared reagent discharge nozzle 25, and the length of the third flow path 43 may be reduced. By increasing the length of the third flow path 43, as described above, the wall surface resistance in the flow path promotes the mixing in the flow path, but in the present embodiment, since the high-concentration reagent and the reagent diluent are simultaneously sent, it is possible to realize a state in which both liquids are sufficiently mixed immediately after passing through the junction unit 37. Accordingly, the length of the third flow path 43 can be reduced, and the refresh operation of the third flow path 43 can be simplified. For example, by forming the third flow path 43 such that the volume thereof is equal to or less than the quantity used in one analysis, even when the concentration of the mixed liquid retained in the third flow path 43 deviates from the normal concentration due to an error, the third flow path 43 can be restored to the original state by discarding the liquid for one cycle.

When two liquid sending mechanisms are used, a diameter of the drive plunger 44 of the liquid sending mechanism provided in the first flow path 41 may be smaller than a diameter of the drive plunger 44 of the liquid sending mechanism provided in the second flow path 42. In the present embodiment, the reagent diluent is sent much more than the high-concentration reagent, and the influence of the variation in the liquid sending quantity of the reagent diluent on the final concentration is much smaller than that of the high-concentration reagent. That is, since the reproducibility of the final concentration mainly depends on the liquid sending quantity of the high-concentration reagent and the accuracy thereof, it is important to send the high-concentration reagent with high accuracy. By reducing the diameter of the drive plunger 44 of the liquid sending mechanism on a high-concentration reagent side, a liquid sending resolution, which is the liquid sending quantity per unit driving quantity of the liquid sending mechanism, can be improved, so that the accuracy of the liquid sending quantity of the high-concentration reagent can be improved.

Other configurations are similar as those in the first embodiment.

The present embodiment configured as above can also exert the same effects as those in the first embodiment.

Third Embodiment

A third embodiment of the invention will be described with reference to FIG. 22.

In the present embodiment, the reagent preparation unit 106 is configured to send the prepared reagent to a plurality of dilution tanks 11 (in other words, ISE analysis units).

FIG. 22 is a diagram showing a reagent preparation unit according to the present embodiment together with related components. In the drawing, the same members as those of the first embodiment and the second embodiment are denoted by the same reference numerals, and descriptions thereof will be omitted. In FIG. 22, the reagent preparation unit according to the first embodiment is used as a base, but the reagent preparation unit according to the second embodiment may also be used as a base.

In FIG. 22, the third flow path 43 is provided with a reagent supply branch unit 54 for branching a reagent into reagent supply destinations. The dilution tanks 11 at discharge destinations can be changed by operations of the respective solenoid valves, and the reagents discharged to the dilution tanks 11 can be respectively analyzed by the ISE analysis units (not shown). In FIG. 18, the reagent can be supplied to the two dilution tanks 11 by one reagent supply branch unit 54, but it is possible to further supply the reagent to different dilution tanks 11 by adding the reagent supply branch unit 54.

When the reagent is supplied to the plurality of dilution tanks 11, it is desirable to match the pipe resistances of the flow paths from the reagent supply branch unit 54 to the respective prepared reagent discharge nozzles 25. This is because, as described in paragraph 51, the quantity of the high-concentration reagent leaking from the first flow path 41 at the junction unit 37 at the end of discharge is constant when the liquid is sent to a flow path system having different pipe resistances.

Other configurations are similar as those in the first and second embodiments.

The present embodiment configured as above can also exert the same effects as those in the first and second embodiments.

APPENDIX

The invention is not limited to the above-described embodiments, and includes various modifications. For example, the above embodiments have been described in detail for easy understanding of the invention, and are not necessarily limited to those including all the configurations described above. A part of a configuration according to one embodiment can be replaced with a configuration according to another embodiment. The configuration according to one embodiment may be added to the configuration according to another embodiment. Further, a part of the configuration of each embodiment can be deleted.

REFERENCE SIGNS LIST

1 . . . ISE electrode, 2 . . . reference electrode, 3 . . . high-concentration reagent bottle, 4 . . . reagent diluent bottle, 5 . . . specimen diluent bottle, 6 . . . reference electrode solution bottle, 7 . . . degassing mechanism, 8 . . . reagent suction nozzle, 9 . . . specimen diluent syringe, 10 . . . sipper syringe, 11 . . . dilution tank, 12 . . . preheating, 13 . . . sipper nozzle, 14 . . . sample probe, 15 . . . sample vessel, 16 . . . filter, 17 . . . solenoid valve, 18 . . . solenoid valve, 20 . . . solenoid valve, 21 . . . solenoid valve, 22 . . . solenoid valve, 23 . . . pinch valve, 24 . . . specimen diluent discharge nozzle, 25 . . . prepared reagent discharge nozzle, 26 . . . first waste liquid nozzle, 27 . . . voltmeter, 28 . . . amplifier, 29 . . . control device, 30 . . . second waste liquid nozzle, 31 . . . solenoid valve, 32 . . . solenoid valve, 33 . . . vacuum pump, 34 . . . vacuum bottle, 36 . . . liquid sending syringe, 37 . . . junction unit, 38 . . . solenoid valve, 39 . . . solenoid valve, 40 . . . solenoid valve, 41 . . . first flow path, 42 . . . second flow path, 43 . . . third flow path, 44 . . . drive plunger, 45 . . . cylindrical part, 46 . . . bearing, 47 . . . propeller part, 48 . . . junction unit, 49 . . . disposal branch unit, 50 . . . fourth flow path, 51 . . . solenoid valve, 52 . . . second liquid sending syringe, 53 . . . solenoid valve, 54 . . . reagent supply branch unit, 100 . . . electrolyte analysis apparatus, 101 . . . sample dispensing unit, 102 . . . ISE electrode unit, 103 . . . reagent unit, 104 . . . reference electrode solution supply unit, 105 . . . specimen diluent supply unit, 106 . . . reagent preparation unit, 107 . . . waste liquid mechanism

The invention claimed is:

1. An electrolyte analysis apparatus comprising:
a high-concentration reagent bottle configured to store a high-concentration reagent;
a reagent diluent bottle configured to store a reagent diluent for diluting the high-concentration reagent;
a first flow path configured to send the high-concentration reagent from the high-concentration reagent bottle;
a second flow path configured to send the reagent diluent from the reagent diluent bottle;
a junction unit configured to join the first flow path and the second flow path;
a third flow path configured to send a prepared reagent which is a mixed liquid of the high-concentration reagent and the reagent diluent from the junction unit;
a dilution tank configured to store the prepared reagent;
a prepared reagent discharge nozzle configured to discharge the prepared reagent sent in the third flow path to the dilution tank;
a liquid sending mechanism configured to send the high-concentration reagent and the reagent diluent to the junction unit at a predetermined ratio so that the prepared reagent discharged from the prepared reagent discharge nozzle to the dilution tank through the third flow path has a predetermined concentration, wherein the third flow path has a winding structure wound in a spiral shape with a predetermined radius; and
an analysis unit configured to perform analysis with the prepared reagent stored in the dilution tank, wherein the liquid sending mechanism alternately sends the high-concentration reagent and the reagent diluent to the junction unit.

2. The electrolyte analysis apparatus according to claim 1, wherein
in the prepared reagent, the concentration of the high-concentration reagent with respect to the reagent diluent becomes more uniform toward a downstream side of the third flow path.

3. The electrolyte analysis apparatus according to claim 1, wherein
the liquid sending mechanism includes a liquid sending syringe provided in the first flow path and the second flow path.

4. The electrolyte analysis apparatus according to claim 1, wherein
the liquid sending mechanism includes a liquid sending syringe disposed on a prepared reagent discharge nozzle side of the third flow path.

5. The electrolyte analysis apparatus according to claim 1, wherein
the liquid sending mechanism includes a liquid sending syringe disposed on a junction unit side of the third flow path, and
the liquid sending syringe includes an agitation mechanism configured to stir a fluid inside the liquid sending syringe with a liquid sending operation.

6. The electrolyte analysis apparatus according to claim 1, wherein
in the junction unit, the first flow path is connected vertically downward, and the second flow path is connected above the first flow path.

7. The electrolyte analysis apparatus according to claim 1, wherein
the junction unit has a branching structure for branching the high-concentration reagent sent in the first flow path into at least two and causes the high-concentration reagents branched by the branching structure respectively to be combined with the reagent diluent sent in the first flow path.

8. The electrolyte analysis apparatus according to claim 1, wherein
a plurality of junction units are provided.

9. The electrolyte analysis apparatus according to claim 1, wherein
while sending the prepared reagent necessary for one analysis by the analysis unit to the third flow path, the high-concentration reagent is sent from the first flow path to the junction unit a plurality of times.

10. The electrolyte analysis apparatus according to claim 1, further comprising:
a fourth flow path for configured to discard a mixed liquid of the high-concentration reagent and the reagent diluent in the third flow path; and
a disposal branch unit provided in the third flow path and connecting the fourth flow path to the third flow path.

11. The electrolyte analysis apparatus according to claim 10, wherein
a pipe resistance of the third flow path and a pipe resistance of the fourth flow path from the disposal branch unit are equal to each other.

12. The electrolyte analysis apparatus according to claim 1, wherein
the dilution tank is provided in plural, and
the third flow path is provided with a reagent supply branch unit to branch into a plurality of flow paths for sending the prepared reagent to the plurality of dilution tanks.

13. The electrolyte analysis apparatus according to claim 12, wherein
the plurality of flow paths from the reagent supply branch unit are configured to have equal pipe resistance.

14. The electrolyte analysis apparatus according to claim 1, wherein
the prepared reagent is stirred in the dilution tank by the momentum when the reagent is discharged from the prepared reagent discharge nozzle to the dilution tank.

* * * * *